US012749210B2

(12) United States Patent
Gregoire et al.

(10) Patent No.: US 12,749,210 B2
(45) Date of Patent: Sep. 29, 2026

(54) EDGE ANGLE AND BASELINE ANGLE CORRECTION IN DEPTH IMAGING

(71) Applicant: AIRY3D INC., Montreal (CA)

(72) Inventors: Pascal Gregoire, Montreal (CA); Thierry Giguere, Montreal (CA)

(73) Assignee: AIRY3D INC. (CA)

( * ) Notice: Subject to any disclaimer, the term of this patent is extended or adjusted under 35 U.S.C. 154(b) by 0 days.

(21) Appl. No.: 19/129,560

(22) PCT Filed: Nov. 21, 2023

(86) PCT No.: PCT/CA2023/051558
§ 371 (c)(1),
(2) Date: May 13, 2025

(87) PCT Pub. No.: WO2024/108298
PCT Pub. Date: May 30, 2024

(65) Prior Publication Data

US 2026/0187827 A1 Jul. 2, 2026

Related U.S. Application Data

(60) Provisional application No. 63/384,662, filed on Nov. 22, 2022.

(51) Int. Cl.
*G06T 7/564* (2017.01)
*G02B 5/18* (2006.01)
(Continued)

(52) U.S. Cl.
CPC ................ *G06T 7/564* (2017.01); *G06T 3/60* (2013.01); *G06T 7/13* (2017.01); *G06T 7/80* (2017.01); *G02B 5/1866* (2013.01)

(58) Field of Classification Search
None
See application file for complete search history.

(56) References Cited

U.S. PATENT DOCUMENTS

2019/0045173 A1* 2/2019 Hicks ................. G01B 11/2545
2020/0020075 A1* 1/2020 Khwaja ................. G06T 3/4038
(Continued)

FOREIGN PATENT DOCUMENTS

WO WO 2022155747 A1 7/2022
WO WO 2022179251 A1 9/2022

OTHER PUBLICATIONS

International Search Report and Written Opinion for corresponding PCT application No. PCT/CA2023/051558, dated Jan. 31, 2024.

*Primary Examiner* — Gelek W Topgyal
(74) *Attorney, Agent, or Firm* — Barnes & Thornburg; Steven D. Shipe

(57) ABSTRACT

Depth imaging methods and systems with edge and baseline angle correction are disclosed. The system includes an angle-sensitive optical encoder and an image sensor disposed behind the encoder and having orthogonal pixel axes. The system captures image data including two images representing two scene viewpoints separated from each other by an encoder-defined baseline that is obliquely offset relative to a nominal baseline direction parallel to one of the pixel axes. The method can include steps of identifying an edge present in the two images; determining an angle of the edge; determining a parallel disparity, measured along one of the pixel axes, between the edge as viewed in each of the two images; and determining depth information about the edge based on the parallel disparity, the edge angle, and calibration data relating vectorial disparity information to object distance and edge angle information.

21 Claims, 17 Drawing Sheets

(51) Int. Cl.
*G06T 3/60* (2024.01)
*G06T 7/13* (2017.01)
*G06T 7/80* (2017.01)

(56) References Cited

U.S. PATENT DOCUMENTS

| | | | | |
|---|---|---|---|---|
| 2021/0112230 | A1* | 4/2021 | Katz | H04N 13/128 |
| 2021/0174479 | A1* | 6/2021 | Li | G06T 3/18 |

* cited by examiner

EDGE ANGLE AND BASELINE ANGLE CORRECTION IN DEPTH IMAGING

CROSS REFERENCE TO RELATED APPLICATIONS

The present application is a national stage application under 35 U.S.C. § 371 of International Patent Application No. PCT/CA2023/051558, filed on Nov. 21, 2023, which claims priority to U.S. Provisional Patent Application No. 63/384,662 filed on Nov. 22, 2022. The above-referenced patent applications are incorporated herein by reference in their its entirety.

TECHNICAL FIELD

The technical field generally relates to imaging technology, and more particularly, to systems and methods for depth imaging with edge angle and baseline angle correction.

BACKGROUND

Traditional imaging techniques involve the projection of three-dimensional (3D) scenes onto two-dimensional (2D) planes, resulting in a loss of information, including a loss of depth information. This loss of information is a result of the nature of square-law detectors, such as charge-coupled devices (CCD) and complementary metal-oxide-semiconductor (CMOS) sensor arrays, which can only directly measure the time-averaged intensity of incident light. A variety of imaging techniques, both active and passive, have been developed that can provide 3D image information, including depth information. Non-limiting examples of 3D imaging techniques include, to name a few, stereoscopic and multiscopic imaging, time of flight, structured light, plenoptic and light field imaging, diffraction-grating-based imaging, and depth from focus or defocus. While each of these imaging techniques has certain advantages, each also has some drawbacks and limitations. Challenges therefore remain in the field of 3D imaging.

SUMMARY

The present description generally relates to techniques for determining the depth of an object in a scene from an edge- and baseline-angle-corrected disparity map computed between an image pair captured by a monoscopic depth imaging system.

In accordance with an aspect, there is provided a depth imaging method, including:

receiving image data from a scene captured with a depth imaging system including (i) an image sensor configured to detect light incident from the scene and (ii) an angle-sensitive optical encoder interposed between the image sensor and the scene, the image sensor including a pixel array having a first pixel axis and a second pixel axis orthogonal to each other, and the angle-sensitive optical encoder being configured to modulate the incident light prior to detection by the pixel array in accordance with an angle of incidence of the incident light, wherein the image data includes a first set of pixel responses and a second set of pixel responses corresponding to a first set of pixels and a second set of pixels of the pixel array, respectively, wherein the first set of pixel responses and the second set of pixel responses vary differently from each other as a function of angle of incidence, wherein the first set of pixel responses and the second set of pixel responses form a first image and a second image of the scene, respectively, and wherein the first image and the second image represent two different viewpoints of the scene separated from each other by an effective baseline defined by the angle-sensitive optical encoder and oriented at a baseline angle that is obliquely offset with respect to a nominal baseline direction parallel to the first pixel axis;

identifying an edge present in the first image and the second image;

determining an edge angle associated with the edge;

determining a parallel disparity representing a distance in image space between the edge as viewed in the first image and the edge as viewed in the second image, wherein the parallel disparity is measured along a disparity axis parallel to the first pixel axis; and determining depth information about the edge based on the determined parallel disparity, the determined edge angle, and calibration data relating vectorial disparity information along and transverse to the nominal baseline direction to object distance information and edge angle information.

In some embodiments, the determining the parallel disparity includes: computing a plurality of summed pixel responses based on a sum operation between the first set of pixel responses and the second set of pixel responses; computing a plurality of differential pixel responses based on a difference operation between the first set of pixel responses and the second set of pixel responses; and computing the parallel disparity based on the plurality of summed pixel responses and the plurality of differential pixel responses.

In some embodiments, the calibration data includes a set of depth calibration curves, each depth calibration curve corresponding to a different edge angle value and relating parallel disparity values to corresponding object distance values over a range of object distances. In some embodiments, the object distance values are expressed with respect to a focus distance of the depth imaging system. In some embodiments, each depth calibration curve is expressed mathematically as follows:

$$d_{\parallel} = (S_x + S_y \tan(\gamma))\left(\frac{1}{z_d} - \frac{1}{z_f}\right) + \Delta_y \tan(\gamma),$$

wherein $d_{\parallel}$ is the parallel disparity, $S_x$ is a depth sensitivity parameter of the angle-sensitive optical encoder along the nominal baseline direction, $S_y$ is a depth sensitivity parameter of the angle-sensitive optical encoder transverse to the nominal baseline direction, $\gamma$ is the edge angle value associated with the depth calibration curve, $z_d$ is the object distance, $z_f$ is a focus distance of the depth imaging system, and $\Delta_y$ is depth-independent disparity offset measured transverse to the nominal baseline direction.

In some embodiments, determining the depth information about the edge includes: computing an edge-angle-independent disparity from the determined edge angle and the determined parallel disparity; and computing the depth information from the computed edge-angle-independent disparity. In some embodiments, computing the edge-angle-independent disparity includes computing a projection along the first pixel axis of a distance in image space between a point of the edge as viewed in the first image and a corresponding point of the edge as viewed in the second image.

In some embodiments, the angle-sensitive optical encoder includes a transmissive diffraction mask (TDM) having a grating axis parallel to the first pixel axis, the TDM being configured to diffract the light incident from the scene to generate diffracted light, the diffracted light having angle-dependent information encoded therein for detection by the image sensor as the captured image data. In some embodiments, the TDM includes a binary phase grating including a series of alternating ridges and grooves that extends along the grating axis at a grating period. In some embodiments, the pixel array has a pixel pitch along the first pixel axis that is equal to half of the grating period.

In some embodiments, the angle-sensitive optical encoder includes an array of microlenses, each microlens covering at least two pixels of the image sensor.

In some embodiments, the method further includes capturing the image data with the depth imaging system.

In accordance with another aspect, there is provided a non-transitory computer readable storage medium having stored thereon computer readable instructions that, when executed by a processor, cause the processor to perform the disclosed method.

In accordance with another aspect, there is provided a depth imaging system, including:

- an image sensor including a pixel array having a first pixel axis and a second pixel axis orthogonal to each other;
- an angle-sensitive optical encoder disposed over the image sensor; and
- a computer device operatively coupled to the image sensor and including a processor and a non-transitory computer readable storage medium having stored thereon computer readable instructions that, when executed by the processor, cause the processor to perform operations,
- wherein the image sensor is configured to capture image data from a scene by detecting, with the pixel array, light incident from the scene having passed through the angle-sensitive optical encoder, wherein the image data includes a first set of pixel responses corresponding to a first set of pixels of the pixel array and a second set of pixel responses corresponding to a second set of pixels of the pixel array, wherein the first set of pixel responses form a first image of the scene and the second set of pixel responses form a second image of the scene, and wherein the first image and the second image represent two different viewpoints of the scene separated from each other by an effective baseline defined by the angle-sensitive optical encoder and oriented at a baseline angle that is obliquely offset with respect to a nominal baseline direction parallel to the first pixel axis,
- wherein the angle-sensitive optical encoder is configured to modulate the incident light prior to detection by the pixel array in accordance with an angle of incidence of the incident light such that the first set of pixel responses and the second set of pixel responses vary differently from each other as a function of angle of incidence, and
- wherein the operations performed by the processor include:
  - receiving the image data from the scene captured by the image sensor;
  - identifying an edge present in the first image and the second image;
  - determining an edge angle associated with the edge;
  - determining a parallel disparity representing a distance in image space between the edge as viewed in the first image and the edge as viewed in the second image, wherein the parallel disparity is measured along a disparity axis parallel to the first pixel axis; and
  - determining depth information about the edge based on the determined parallel disparity, the determined edge angle, and calibration data relating vectorial disparity information along and transverse to the nominal baseline direction to object distance information and edge angle information.

In some embodiments, the angle-sensitive optical encoder includes a transmissive diffraction mask (TDM), the TDM having a grating axis parallel to the first pixel axis and being configured to diffract the light incident from the scene to generate diffracted light, the diffracted light having angle-dependent information encoded therein for detection by the image sensor as the captured image data. In some embodiments, the TDM includes a binary phase grating including a series of alternating ridges and grooves that extends along the grating axis at a grating period. In some embodiments, the pixel array has a pixel pitch along the first pixel axis that is equal to half of the grating period.

In some embodiments, the angle-sensitive optical encoder includes an array of microlenses, each microlens covering at least two pixels of the image sensor.

In some embodiments, the image sensor includes a color filter array interposed between the angle-sensitive optical encoder and the array of pixels.

In some embodiments, determining the parallel disparity includes: computing a plurality of summed pixel responses based on a sum operation between the first set of pixel responses and the second set of pixel responses; computing a plurality of differential pixel responses based on a difference operation between the first set of pixel responses and the second set of pixel responses; and computing the parallel disparity based on the plurality of summed pixel responses and the plurality of differential pixel responses.

In some embodiments, the calibration data includes a set of depth calibration curves, each depth calibration curve corresponding to a different edge angle value and relating parallel disparity values to corresponding object distance values over a range of object distances. In some embodiments, the object distance values are expressed with respect to a focus distance of the depth imaging system. In some embodiments, each depth calibration curve is expressed mathematically as follows:

$$d_{\|} = (S_x + S_y \tan(\gamma))\left(\frac{1}{z_d} - \frac{1}{z_f}\right) + \Delta_y \tan(\gamma),$$

wherein $d_{\|}$ is the parallel disparity, $S_x$ is a depth sensitivity parameter of the angle-sensitive optical encoder along the nominal baseline direction, $S_y$ is a depth sensitivity parameter of the angle-sensitive optical encoder transverse to the nominal baseline direction, $\gamma$ is the edge angle value associated with the depth calibration curve, $z_d$ is the object distance, $z_f$ is a focus distance of the depth imaging system, and $\Delta_y$ is depth-independent disparity offset of the depth imaging system transverse to the nominal baseline direction.

In some embodiments, determining the depth information about the edge includes: computing an edge-angle-independent disparity from the determined edge angle and the determined parallel disparity; and computing the depth information from the computed edge-angle-independent disparity. In some embodiments, computing the edge-angle-independent disparity including computing a projection along the first pixel axis of a distance in image space between a point of the edge as viewed in the first image and a corresponding point of the edge as viewed in the second image.

In accordance with another aspect, there is provided a depth imaging method, including:

receiving image data from a scene captured with a depth imaging system including (i) an image sensor configured to detect light incident from the scene and (ii) an angle-sensitive optical encoder interposed between the image sensor and the scene, the image sensor including a pixel array having a first pixel axis and a second pixel axis orthogonal to each other, and the angle-sensitive optical encoder being configured to modulate the incident light prior to detection by the pixel array in accordance with an angle of incidence of the incident light, wherein the image data includes a first set of pixel responses and a second set of pixel responses corresponding to a first set of pixels and a second set of pixels of the pixel array, respectively, wherein the first set of pixel responses and the second set of pixel responses vary differently from each other as a function of angle of incidence, wherein the first set of pixel responses and the second set of pixel responses form a first image and a second image of the scene, respectively, and wherein the first image and the second image represent two different viewpoints of the scene separated from each other by an effective baseline defined by the angle-sensitive optical encoder and oriented at a baseline angle that is obliquely offset with respect to a nominal baseline direction parallel to the first pixel axis;

performing an image transformation operation on the image data, wherein the image transformation operation includes applying an image rotation operation to each of the first image and the second image in a direction toward the first pixel axis by a rotation angle related to the baseline angle, thereby obtaining a baseline-angle-corrected first image and a baseline-angle-corrected second image;

determining a parallel disparity representing a distance in image space between a scene feature as viewed in the baseline-angle-corrected first image and the scene feature as viewed in the baseline-angle-corrected second image, wherein the parallel disparity is measured along a disparity axis parallel to the first pixel axis; and determining depth information about the edge based on the parallel disparity and calibration data relating disparity information along the nominal baseline direction to object distance information.

In some embodiments, the baseline-angle-corrected first image is composed of a first set of corrected pixel responses related to the first set of pixel responses by the image rotation operation, the baseline-angle-corrected second image is composed of a second set of corrected pixel responses related to the second set of pixel responses by the image rotation operation, and determining the parallel disparity includes: computing a corrected summed image based on a sum operation between the first set of corrected pixel responses and the second set of corrected pixel responses; computing a corrected differential image based on a difference operation between the first set of corrected pixel responses and the second set of corrected pixel responses; and computing the parallel disparity based on the corrected summed image and the corrected differential image.

In some embodiments, the calibration data relating disparity information along the nominal baseline direction to object distance information includes a depth calibration curve relating parallel disparity values to corresponding object distance values over a range of object distances. In some embodiments, the object distance values are expressed with respect to a focus distance of the depth imaging system.

In some embodiments, the image transformation operation further includes, prior to applying image rotation operation to the first image and the second image: applying an image translation operation to the first image and/or the second image along a translation direction transverse to the nominal baseline direction to correct for a depth-independent disparity offset in the response of the depth imaging system. In some embodiments, the depth-independent disparity offset is less than one pixel, and the image translation operation includes an interpolation operation.

In some embodiments, the angle-sensitive optical encoder includes a transmissive diffraction mask (TDM) having a grating axis parallel to the first pixel axis, the TDM being configured to diffract the light incident from the scene to generate diffracted light, the diffracted light having angle-dependent information encoded therein for detection by the image sensor as the captured image data. In some embodiments, the TDM includes a binary phase grating including a series of alternating ridges and grooves that extends along the grating axis at a grating period. In some embodiments, the pixel array has a pixel pitch along the first pixel axis that is equal to half of the grating period.

In some embodiments, the angle-sensitive optical encoder includes an array of microlenses, each microlens covering at least two pixels of the image sensor.

In some embodiments, the method further includes capturing the image data with the depth imaging system.

In accordance with another aspect, there is provided a non-transitory computer readable storage medium having stored thereon computer readable instructions that, when executed by a processor, cause the processor to perform the disclosed method.

In accordance with another aspect, there is provided a depth imaging system, including:

an image sensor including a pixel array having a first pixel axis and a second pixel axis orthogonal to each other;

an angle-sensitive optical encoder disposed over the image sensor; and a computer device operatively coupled to the image sensor and including a processor and a non-transitory computer readable storage medium having stored thereon computer readable instructions that, when executed by the processor, cause the processor to perform operations, wherein the image sensor is configured to capture image data from a scene by detecting, with the pixel array, light incident from the scene having passed through the angle-sensitive optical encoder, wherein the image data includes a first set of pixel responses corresponding to a first set of pixels of the pixel array and a second set of pixel responses corresponding to a second set of pixels of the pixel array, wherein the first set of pixel responses form a first image of the scene and the second set of pixel responses form a second image of the scene, and wherein the first image and the second image representing two different viewpoints of the scene separated from each other by an effective baseline defined by the angle-sensitive optical encoder and oriented at a baseline angle that is obliquely offset with respect to a nominal baseline direction parallel to the first pixel axis, wherein the angle-sensitive optical encoder is configured to modulate the incident light prior to detection by the pixel array in accordance with an angle of incidence of the incident light such that the first set of pixel responses and the second set of pixel responses vary differently from each other as a function of angle of incidence, and wherein the operations performed by the processor include:

receiving the image data from the scene captured by the image sensor;

performing an image transformation operation on the image data, wherein the image transformation operation includes applying an image rotation operation to each of the first image and the second image in a direction toward the first pixel axis by a rotation angle equal to the baseline angle, thereby obtaining a baseline-angle-corrected first image and a baseline-angle-corrected second image;

determining a parallel disparity representing a distance in image space between a scene feature as viewed in the baseline-angle-corrected first image and the scene feature as viewed in the baseline-angle-corrected second image, wherein the parallel disparity is measured along a disparity axis parallel to the first pixel axis; and determining depth information about the scene feature based on the parallel disparity and calibration data relating disparity information along the nominal baseline direction to object distance information.

In some embodiments, the angle-sensitive optical encoder includes a transmissive diffraction mask (TDM), the TDM having a grating axis parallel to the first pixel axis and being configured to diffract the light incident from the scene to generate diffracted light, the diffracted light having angle-dependent information encoded therein for detection by the image sensor as the captured image data. In some embodiments, the TDM includes a binary phase grating including a series of alternating ridges and grooves that extends along the grating axis at a grating period. In some embodiments, the pixel array has a pixel pitch along the first pixel axis that is equal to half of the grating period.

In some embodiments, the angle-sensitive optical encoder includes an array of microlenses, each microlens covering at least two pixels of the image sensor.

In some embodiments, the image sensor includes a color filter array interposed between the angle-sensitive optical encoder and the array of pixels.

In some embodiments, the calibration data relating disparity information along the nominal baseline direction to object distance information includes a depth calibration curve relating parallel disparity values to corresponding object distance values over a range of object distances. In some embodiments, the object distance values are expressed with respect to a focus distance of the depth imaging system.

In some embodiments, the baseline-angle-corrected first image is composed of a first set of corrected pixel responses related to the first set of pixel responses by the image rotation operation, the baseline-angle-corrected second image is composed of a second set of corrected pixel responses related to the second set of pixel responses by the image rotation operation, and determining the parallel disparity includes: computing a corrected summed image based on a sum operation between the first set of corrected pixel responses and the second set of corrected pixel responses; computing a corrected differential image based on a difference operation between the first set of corrected pixel responses and the second set of corrected pixel responses; and computing the parallel disparity based on the corrected summed image and the corrected differential image.

In some embodiments, the image transformation operation further includes, prior to applying image rotation operation to the first image and the second image: applying an image translation operation to the first image and/or the second image along a translation direction transverse to the nominal baseline direction to correct for a depth-independent disparity offset in the response of the depth imaging system. In some embodiments, the depth-independent disparity offset is less than one pixel, and the image translation operation includes an interpolation operation.

Other method and process steps may be performed prior, during or after the steps described herein. The order of one or more steps may also differ, and some of the steps may be omitted, repeated, and/or combined, as the case may be. It is also to be noted that some steps may be performed using various analysis and processing techniques, which may be implemented in hardware, software, firmware, or any combination thereof.

Other objects, features, and advantages of the present description will become more apparent upon reading of the following non-restrictive description of specific embodiments thereof, given by way of example only with reference to the appended drawings. Although specific features described in the above summary and in the detailed description below may be described with respect to specific embodiments or aspects, it should be noted that these specific features may be combined with one another unless stated otherwise.

BRIEF DESCRIPTION OF THE DRAWINGS

FIG. 4 also depicts curves of the sum $I_{sum}=I_++I_-$ and the difference $I_{diff}=I_+-I_-$ of the odd and even pixel responses as functions of $\theta$.

(FIG. 7A: $\gamma=0$; FIG. 7B: $\gamma>0$; and FIG. 7C: $\gamma<0$).

(FIGS. 8A and 8C: $S_y=0$; FIGS. 8B and 8D: $S_y\neq0$), and the offset parameter $\Delta_y$ (FIGS. 8A and 8B: $\Delta_y=0$; FIGS. 8C and 8D: $\Delta_y\neq0$).

DETAILED DESCRIPTION

Figure 1:
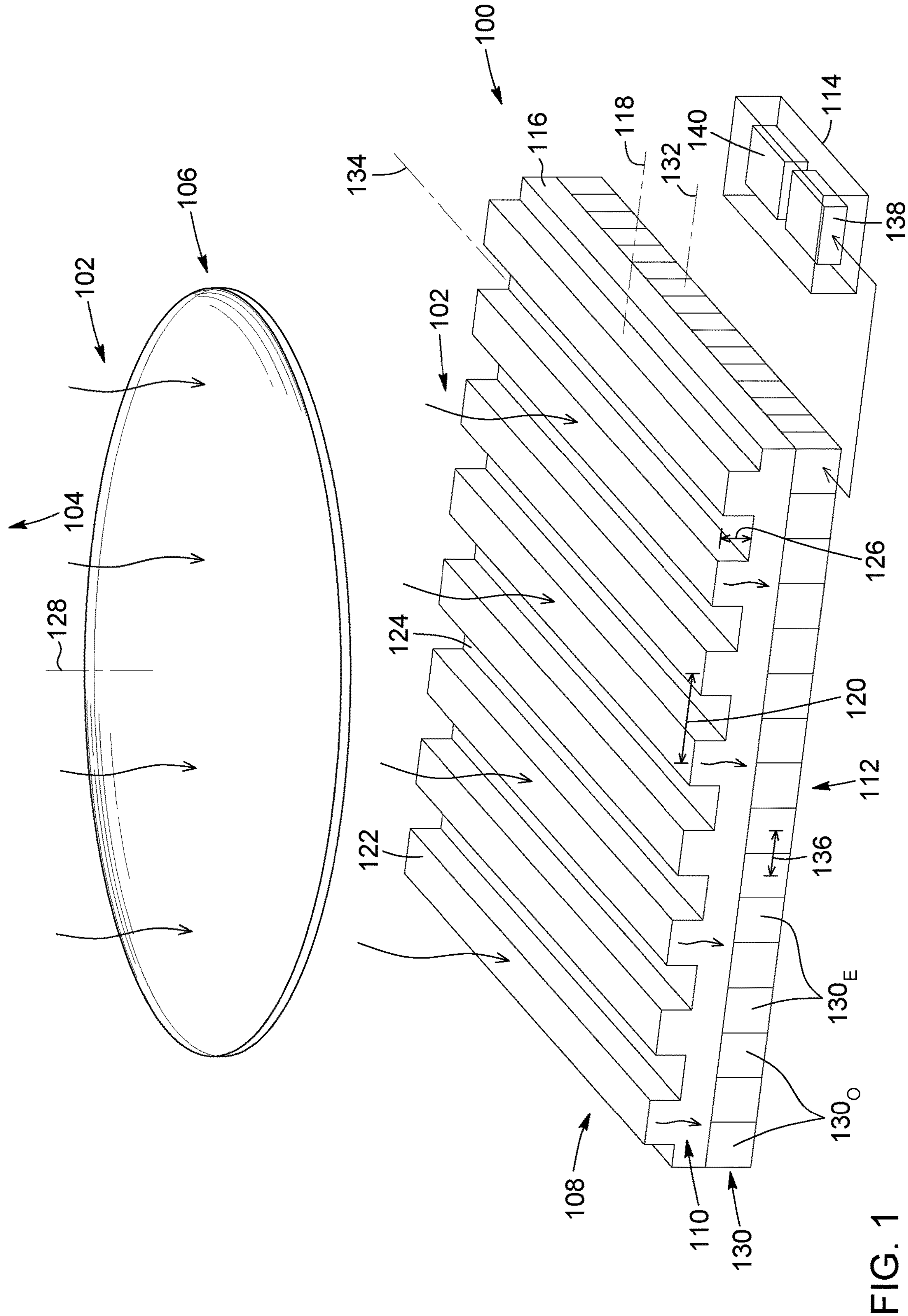
FIG. 1 is a schematic perspective view of a depth imaging system, in accordance with an embodiment.

In the present description, similar features in the drawings have been given similar reference numerals. To avoid cluttering certain figures, some elements may not be indicated if they were already identified in a preceding figure. The elements of the drawings are not necessarily depicted to scale since emphasis is placed on clearly illustrating the elements and structures of the present embodiments. Positional descriptors indicating the location and/or orientation of one element with respect to another element are used herein for ease and clarity of description. Unless otherwise indicated, these positional descriptors should be taken in the context of the figures and should not be considered limiting. In particular, positional descriptors are intended to encompass different orientations in the use or operation of the present embodiments, in addition to the orientations exemplified in the figures. Furthermore, when a first element is referred to as being "on", "above", "below", "over", or "under" a second element, the first element can be either directly or indirectly on, above, below, over, or under the second element, respectively, such that one or multiple intervening elements may be disposed between the first element and the second element.

The terms "a", "an", and "one" are defined herein to mean "at least one", that is, these terms do not exclude a plural number of elements, unless stated otherwise.

The term "or" is defined herein to mean "and/or", unless stated otherwise.

Terms such as "substantially", "generally", and "about", which modify a value, condition, or characteristic of a feature of an exemplary embodiment, should be understood to mean that the value, condition, or characteristic is defined within tolerances that are acceptable for the proper operation of this exemplary embodiment for its intended application and/or that fall within an acceptable range of experimental error. In particular, the term "about" generally refers to a range of numbers that one skilled in the art would consider equivalent to the stated value (e.g., having the same or an equivalent function or result). In some instances, the term "about" means a variation of ±10% of the stated value. It is noted that all numeric values used herein are assumed to be modified by the term "about", unless stated otherwise. The term "between" as used herein to refer to a range of numbers or values defined by endpoints is intended to include both endpoints, unless stated otherwise.

The term "based on" as used herein is intended to mean "based at least in part on", whether directly or indirectly, and to encompass both "based solely on" and "based partly on". In particular, the term "based on" may also be understood as meaning "depending on", "representative of", "indicative of", "associated with", "relating to", and the like.

The terms "match", "matching", and "matched" refer herein to a condition in which two elements are either the same or within some predetermined tolerance of each other. That is, these terms are meant to encompass not only "exactly" or "identically" matching the two elements, but also "substantially", "approximately", or "subjectively" matching the two elements, as well as providing a higher or best match among a plurality of matching possibilities.

The terms "connected" and "coupled", and derivatives and variants thereof, refer herein to any connection or coupling, either direct or indirect, between two or more elements, unless stated otherwise. For example, the connection or coupling between the elements may be mechanical, optical, electrical, magnetic, thermal, chemical, logical, fluidic, operational, or any combination thereof.

The term "concurrently" refers herein to two or more processes that occur during coincident or overlapping time periods. The term "concurrently" does not necessarily imply complete synchronicity and encompasses various scenarios including time-coincident or simultaneous occurrence of two processes; occurrence of a first process that both begins and ends during the duration of a second process; and occurrence of a first process that begins during the duration of a second process, but ends after completion of the second process.

The terms "light" and "optical", and variants and derivatives thereof, refer herein to radiation in any appropriate region of the electromagnetic spectrum. These terms are not limited to visible light, but may also include invisible regions of the electromagnetic spectrum including, without limitation, the terahertz (THz), infrared (IR), and ultraviolet (UV) regions. In some embodiments, the present techniques may be used with electromagnetic radiation having a center wavelength ranging from about 175 nanometers (nm) in the deep ultraviolet to about 300 micrometers (μm) in the terahertz range, for example, from about 400 nm at the blue end of the visible spectrum to about 1550 nm at telecommunication wavelengths, or between about 400 nm and about 650 nm to match the spectral range of typical red-green-blue (RGB) color filters. However, these wavelength ranges are provided for illustrative purposes, and that the present techniques may operate beyond these ranges.

The present description generally relates to imaging systems and methods for determining the depth of an object in a scene using a disparity computed from a pair of images of the object. The computed disparity accounts for the orientation of an edge associated with the object and the angle of a baseline associated with a depth imaging system used to capture the pair of images.

The present techniques may be used in various applications. Non-limiting examples of possible fields of application include, to name a few, consumer electronics (e.g., mobile phones, tablets, laptops, webcams, and notebooks, gaming, virtual and augmented reality, photography), automotive applications (e.g., advanced driver assistance systems, in-cabin monitoring), industrial applications (e.g., inspection, robot guidance, object identification and tracking), medical applications (e.g., endoscopy), and security and surveillance (e.g., motion tracking; traffic monitoring; drones; agricultural inspection).

Various aspects and implementations of the present techniques are described below with reference to the figures.

Figure 2:
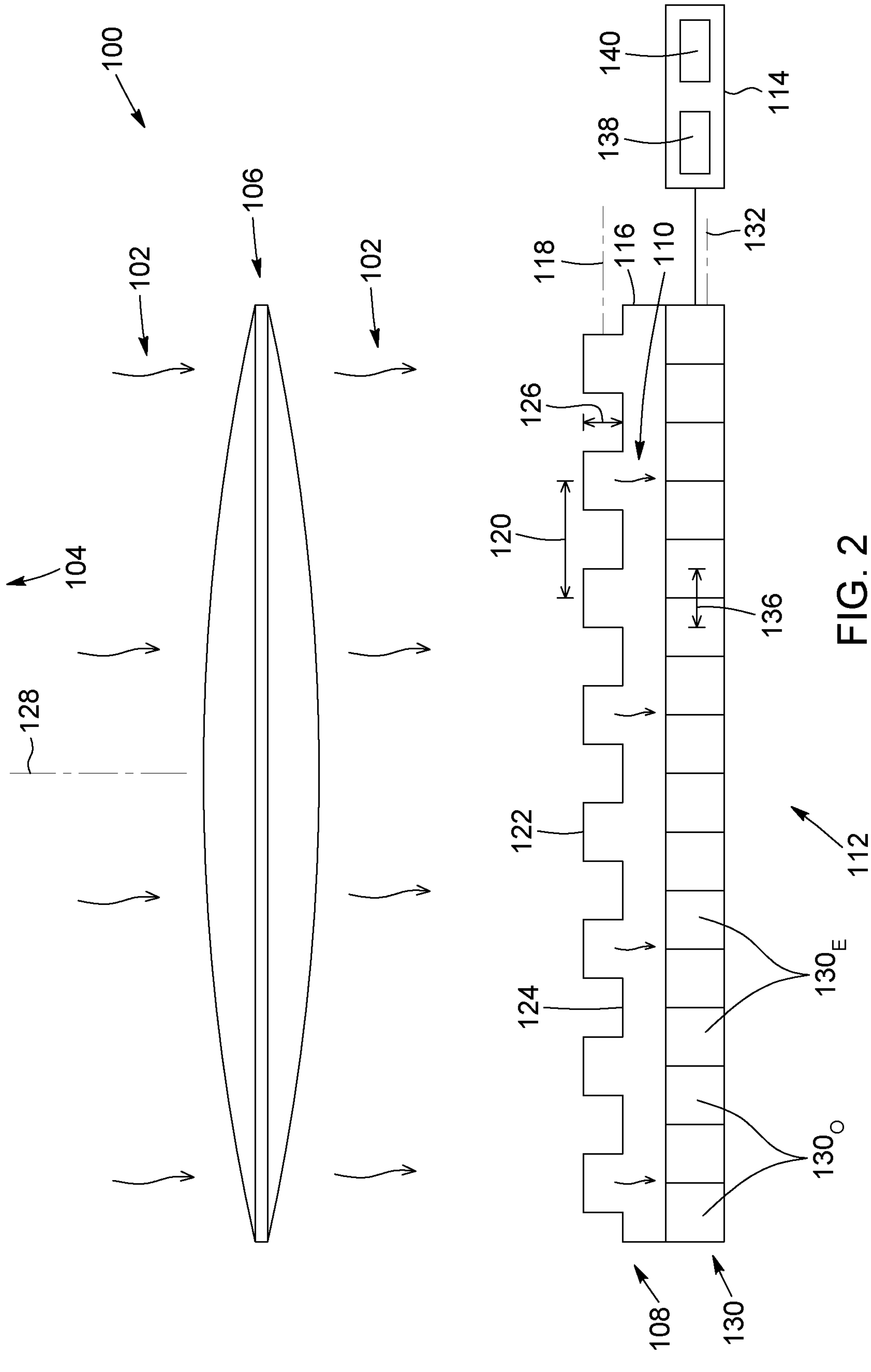
FIG. 2 is a schematic front elevation view of the depth imaging system of FIG. 1.

Referring to FIGS. 1 and 2, there are provided schematic representations of an embodiment of a depth imaging system 100 for capturing image data representative of light 102 received from a scene 104 within a field of view of the imaging system 100. The captured image data includes depth information about the scene 104. The term "scene" refers herein to any region, space, area, environment, feature, or information of interest which may be imaged according to the present techniques. In some instances the term "depth imaging system" may be shortened to "imaging system" for conciseness.

The imaging system 100 illustrated in FIGS. 1 and 2 generally includes an imaging lens 106 configured to receive and transmit the light 102 from the scene 104; an angle-sensitive optical encoder embodied by a transmissive diffraction mask (TDM) 108 configured to diffract the light 102 received from the imaging lens 106 to generate diffracted light 110 having encoded therein information about the angle of incidence of the received light 102; an image sensor 112 configured to detect the diffracted light 110 and convert the detected diffracted light 110 into image data; and a computer device 114 configured to process the image data generated by the image sensor 112 to determine angle-of-incidence-dependent information about the received light 102, from which depth information about the scene 104 may be determined. The structure, configuration, and operation of these and other possible components of the imaging system 100 are described in greater detail below. It is appreciated that FIGS. 1 and 2 are simplified schematic representations that illustrate a number of feature and components of the imaging system 100, such that additional features and components that may be useful or necessary for the practical operation of the imaging system 100 may not be specifically depicted.

The provision of an angle-sensitive optical encoder, such as a TDM 108, between the imaging lens 106 and the image sensor 112 can impart the depth imaging system 100 with 3D imaging capabilities, including depth sensing capabilities. This is because the TDM 108 is configured to diffract the light 102 received thereon into diffracted light 110 whose intensity pattern is spatially modulated in accordance with the angle-of-incidence distribution of the received light 102. The angle-of-incidence distribution of the received light 102 is affected by the passage of the received light 102 through the imaging lens 106. The underlying image sensor 112 is configured to sample, on a per-pixel basis, the intensity pattern of the diffracted light 110 in the near-field to provide image data conveying information indicative of the angle of incidence of the received light 102. The image data may be used or processed in a variety of ways to provide multiple functions including, but not limited to, 3D depth map extraction, 3D surface reconstruction, image refocusing, and the like. Depending on the application, the image data may be acquired as one or more still images or as a video stream.

The structure, configuration, and operation of imaging devices that use transmissive diffraction grating structures in front of 2D image sensors to provide 3D imaging capabilities are described in the following co-assigned international patent applications PCT/CA2017/050686 (published as WO 2017/210781), PCT/CA2018/051554 (published as WO 2019/109182), PCT/CA2020/050760 (published as WO 2020/243828), PCT/CA2021/051635 (published as WO 2022/104467), and PCT/CA2022/050018 (published as WO 2022/150903), as well as in the following master's thesis: Kunnath, Neeth, *Depth from Defocus Using Angle Sensitive Pixels Based on a Transmissive Diffraction Mask* (Master's thesis, McGill University Libraries, 2018). The contents of these six documents are incorporated herein by reference in their entirety. It is appreciated that the theory and applications of such diffraction-based 3D imaging devices are generally known in the art, and need not be described in detail herein other than to facilitate an understanding of the present techniques.

In the embodiment illustrated in FIGS. 1 and 2, the TDM 108 includes a diffraction grating 116 having a grating axis 118 and a grating profile. The grating profile has a grating period 120 along the grating axis 118.

The term "diffraction grating", or simply "grating", refers herein to a structure or material having a spatially modulated optical property and configured to spatially modulate the amplitude and/or the phase of an optical wavefront incident thereon. The spatially modulated optical property, for example, a refractive index modulation pattern, defines the grating profile. In some embodiments, a diffraction grating may include a periodic arrangement of diffracting elements, such as alternating ridges and grooves, whose spatial period, the grating period, is substantially equal to or longer than the center wavelength of the optical wavefront incident thereon. Diffraction gratings may also be classified as "amplitude gratings" or "phase gratings", depending on the nature of the diffracting elements. In amplitude gratings, the perturbations to the incident wavefront caused by the grating are the result of a direct amplitude modulation. In phase gratings, the incident wavefront perturbations are the result of a modulation of the relative group velocity of light caused by a spatial variation of the refractive index of the grating structure or material. In several embodiments disclosed herein, the diffraction gratings are phase gratings, which generally absorb less light than amplitude gratings, although amplitude gratings may be used in other embodiments. In general, a diffraction grating is spectrally dispersive, if only slightly, so that different wavelengths of an incident optical wavefront may be diffracted differently. However, diffraction gratings exhibiting a substantially achromatic response over a certain operating spectral range can be used in some embodiments.

The diffraction grating 116 in FIGS. 1 and 2 is a transmission phase grating, more specifically a binary phase grating whose grating profile is a two-level, square-wave function. The grating profile includes a series of ridges 122 periodically spaced apart at the grating period 120, interleaved with a series of grooves 124 also periodically spaced apart at the grating period 120. In such a case, the grating period 120 corresponds to the sum of the width, along the grating axis 118, of one ridge 122 and one adjacent groove 124. The diffraction grating 116 may also be characterized by a duty cycle, defined as the ratio of the ridge width to the grating period 120, and by a step height 126, defined as the difference in level between the ridges 122 and the grooves 124. The step height 126 may provide a predetermined optical path difference between the ridges 122 and the grooves 124. In some embodiments, the grating period 120 may range between about 0.1 μm and about 20 μm, and the step height 126 may range between about 0.1 μm and about 1 μm, although values outside these ranges can be used in other embodiments. In the illustrated embodiment, the diffraction grating 116 has a duty cycle equal to 50% but duty cycle values different from 50% may be used in other embodiments. Depending on the application, the grooves 124 may be empty or filled with a material having a refractive index different from that of the ridge material. In the illustrated embodiment, the TDM 108 includes a single diffraction grating 116. However, TDMs including more than one diffraction grating may be used in other embodiments.

The imaging lens 106 is disposed between the scene 104 and the TDM 108. The imaging lens 106 is configured to receive the light 102 from the scene 104 and focus or otherwise direct the received light 102 onto the TDM 108. The imaging lens 106 can define an optical axis 128 of the imaging system 100. Depending on the application, the imaging lens 106 may include a single lens element or a plurality of lens elements. In some embodiments, the imaging lens 106 may be a focus-tunable lens assembly. In such a case, the imaging lens 106 may be operated to provide autofocus, zoom, and/or other optical functions.

The image sensor 112 includes an array of photosensitive pixels 130. The pixels 130 are configured to detect electromagnetic radiation incident thereon and convert the detected radiation into electrical signals that can be processed to generate image data conveying information about the scene 104. In the illustrated embodiment, each pixel 130 is configured to detect a corresponding portion of the diffracted light 110 produced by the TDM 108 and generate therefrom a respective pixel response. The pixels 130 may each include a light-sensitive region and associated pixel circuitry for processing signals and communicating with other electronics. In general, each pixel 130 may be individually addressed and read out. In the illustrated embodiment, the pixels 130 are arranged in an array of rows and columns defined by first and second orthogonal pixel axes 132, 134, although other arrangements may be used in other embodiments. For example, in some embodiments, the diffraction grating 116 may be arranged over the pixel array such that the grating axis 118 is obliquely oriented with respect to the pixel rows and columns (e.g., at a 45° angle). In such a case, the pixel axes 132, 134 may be defined such that one of the pixel axes (e.g., the first pixel axis 132) is parallel to the grating axis 118 and the other pixel axis (e.g., the second pixel axis 134) is perpendicular to the grating axis 118. It is appreciated that by defining the pixel axes 132, 134 in this manner, it can be ensured that the first pixel axis 132 remains parallel to the nominal baseline direction and the parallel disparity (see below) even if the grating axis 118 is oriented obliquely relative to the pixel rows and columns. In some embodiments, the image sensor 112 may include hundreds of thousands, or even millions, of pixels 130, for example, from about 1080×1920 to about 6000×8000 pixels. However, many other sensor configurations with different pixel arrangements, aspect ratios, and fewer or more pixels are contemplated. Depending on the application, the pixels 130 of the image sensor 112 may or may not be all identical. In some embodiments, the image sensor 112 may be a CMOS or a CCD array imager, although other types of photodetector arrays (e.g., charge injection devices or photodiode arrays) may also be used. The image sensor 112 may operate according to a rolling or a global shutter readout scheme, and may be part of a stacked, backside, or frontside illumination sensor architecture. Furthermore, the image sensor 112 may be implemented using various image sensor architectures and pixel array configurations, and may include various additional components. Non-limiting examples of such additional components include, to name a few, microlenses, color filters, color filter isolation structures, light guides, pixel circuitry, and the like. The structure, configuration, and operation of such possible additional components are generally known in the art and need not be described in detail herein.

In some embodiments, the imaging system 100 may be implemented by adding or coupling the TDM 108 on top of an existing image sensor 112. For example, the existing image sensor 112 may be a conventional CMOS or CCD imager. In other embodiments, the imaging system 100 may be implemented and integrally packaged as a separate, dedicated, and/or custom-designed device incorporating therein all or most of its hardware components, including the imaging lens 106, the TDM 108, and the image sensor 112. In the embodiment depicted in FIGS. 1 and 2, the TDM 108 extends over the entire pixel array such that all the pixels 130 detect diffracted light 110 having passed through the TDM 108. However, in other embodiments, the TDM 108 may cover only a portion of the pixel array such that only a subset of the pixels 130 detects diffracted light 110.

The array of pixels 130 may be characterized by a pixel pitch 136. The term "pixel pitch" refers herein to the separation (e.g., the center-to-center distance) between nearest-neighbor pixels. In some embodiments, the pixel pitch 136 may range between about 0.7 μm and about 10 μm, although other pixel pitch values may be used in other embodiments. The pixel pitch 136 is defined along the grating axis 118, that is, along the first pixel axis 132 in the illustrated embodiment. Depending on the application, the pixel pitch 136 may be less than, equal to, or greater than the grating period 120. For example, in the illustrated embodiment, the pixel pitch 136 is half as large as the grating period 120. However, other grating-period-to-pixel-pitch ratios, R, may be used in other embodiments. Non-limiting examples of possible ratio values include, to name a few, $R \geq 2$; $R=(n+1)$, where n is a positive integer; $R=2n$, where n is a positive integer; $R=1$; $R=2/(2n+1)$, where n is a positive integer, for example, n=1 or 2; and $R=n/N$, where n and N are positive integers larger than two and N>n, for example, n=3 and N=4.

In the embodiment illustrated in FIGS. 1 and 2, the diffraction grating 116 is disposed over the image sensor 112 such that the center of each ridge 122 is laterally aligned with the midpoint between adjacent pixels 130, and likewise for the center of each groove 124. Different configurations are possible in other embodiments. For example, in some embodiments, the degree of alignment between the TDM 108 and the image sensor 112 may be adjusted in accordance with a chief ray angle (CRA) function or characteristic associated with the imaging lens 106. In such a case, the alignment between the TDM 108 and the image sensor 112 may change as a function of position within the pixel array, for example, as one goes from the center to the edge of the array. This means, for example, that depending on its position within the image sensor 112, a given pixel 130 may be aligned with a center of a ridge 122, a center of a groove 124, a transition between a ridge 122 and a groove 124, or some intermediate position of the corresponding overlying diffraction grating 116.

Referring still to FIGS. 1 and 2, the computer device 114 is operatively coupled to the image sensor 112 to receive therefrom image data about the scene 104. The image data may include a set of pixel responses. The computer device 114 may be configured to determine, from the set of pixel responses, angle-of-incidence information conveying the angle-of-incidence distribution of the received light 102. The computer device 114 may be configured to determine depth information about the scene 104, for example, a depth map, based on the angle-of-incidence information. The computer device 114 may be provided within one or more general purpose computers and/or within any other suitable devices, implemented in hardware, software, firmware, or any combination thereof. The computer device 114 may be connected to the components of the imaging system 100 via appropriate wired and/or wireless communication links and interfaces. Depending on the application, the computer device 114 may be fully or partly integrated with, or physically separate from, the image sensor 112. In some embodiments, the computer device 114 may include a distributed and/or cloud computing network. The computer device 114 can include a processor 138 and a memory 140.

The processor 138 can implement operating systems, and may be able to execute computer programs, also known as commands, instructions, functions, processes, software codes, executables, applications, and the like. While the processor 138 is depicted in FIGS. 1 and 2 as a single entity for illustrative purposes, the term "processor" should not be construed as being limited to a single processing entity, and accordingly, any known processor architecture may be used. In some embodiments, the processor 138 may include a plurality of processing entities. Such processing entities may be physically located within the same device, or the processor 138 may represent the processing functionalities of a plurality of devices operating in coordination. For example, the processor 138 may include or be part of one or more of a computer; a microprocessor; a microcontroller; a coprocessor; a central processing unit (CPU); an image signal processor (ISP); a digital signal processor (DSP) running on a system on a chip (SoC); a single-board computer (SBC); a dedicated graphics processing unit (GPU); a special-purpose programmable logic device embodied in hardware device, such as, for example, a field-programmable gate array (FPGA) or an application-specific integrated circuit (ASIC); a digital processor; an analog processor; a digital circuit designed to process information; an analog circuit designed to process information; a state machine; and/or other mechanisms configured to electronically process information and to operate collectively as a processor.

The memory 140—which may also be referred to as a "computer readable storage medium" or a "computer readable memory"—is configured to store computer programs and other data to be retrieved by the processor 138. The terms "computer readable storage medium" and "computer readable memory" refer herein to a non-transitory and tangible computer product that can store and communicate executable instructions for the implementation of various steps of the techniques disclosed herein. The memory 140 may be any computer data storage device or assembly of such devices, including a random-access memory (RAM); a dynamic RAM; a read-only memory (ROM); a magnetic storage device; an optical storage device; a flash drive memory; and/or any other non-transitory memory technologies. The memory 140 may be associated with, coupled to, or included in the processor 138, and the processor 138 may be configured to execute instructions contained in a computer program stored in the memory 140 and relating to various functions and operations associated with the processor 138. While the memory 140 is depicted in FIGS. 1 and 2 as a single entity for illustrative purposes, the term "memory" should not be construed as being limited to a single memory unit, and accordingly, any known memory architecture may be used. In some embodiments, the memory 140 may include a plurality of memory units. Such memory units may be physically located within the same device, or the memory 140 can represent the functionalities of a plurality of devices operating in coordination.

Figure 3A:
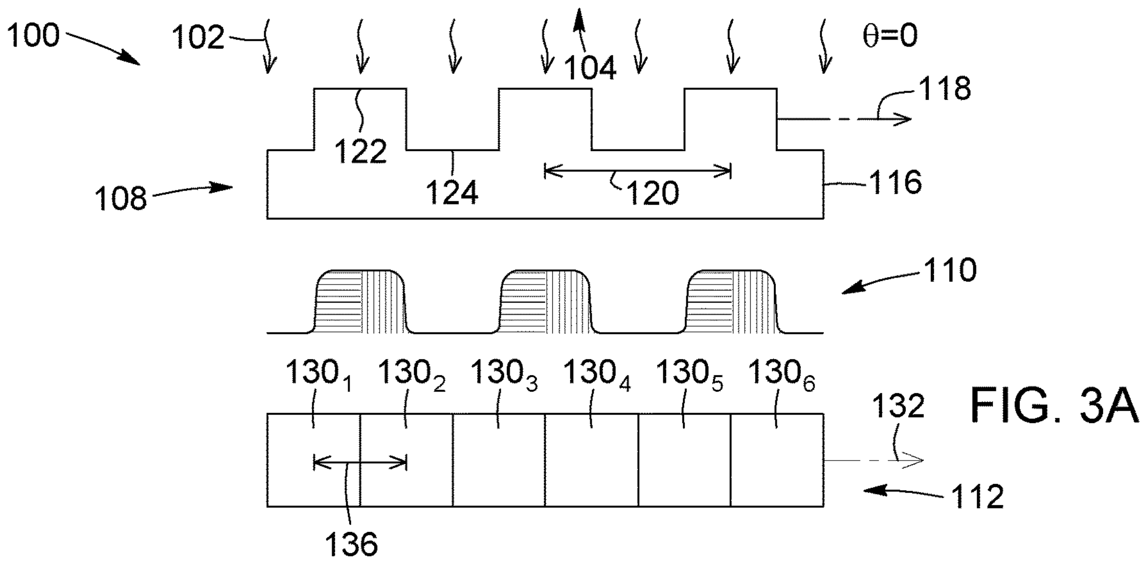
FIGS. 3A to 3C are schematic representations of an example of a depth imaging system including a transmissive diffractive mask and receiving light with three different angles of incidence $\theta$: normal incidence, $\theta=0$ (FIG. 3A); oblique incidence, $\theta=\theta_{max}>0$ (FIG. 3B); and oblique incidence, $\theta=-\theta_{max}<0$ (FIG. 3C).
Figure 3B:
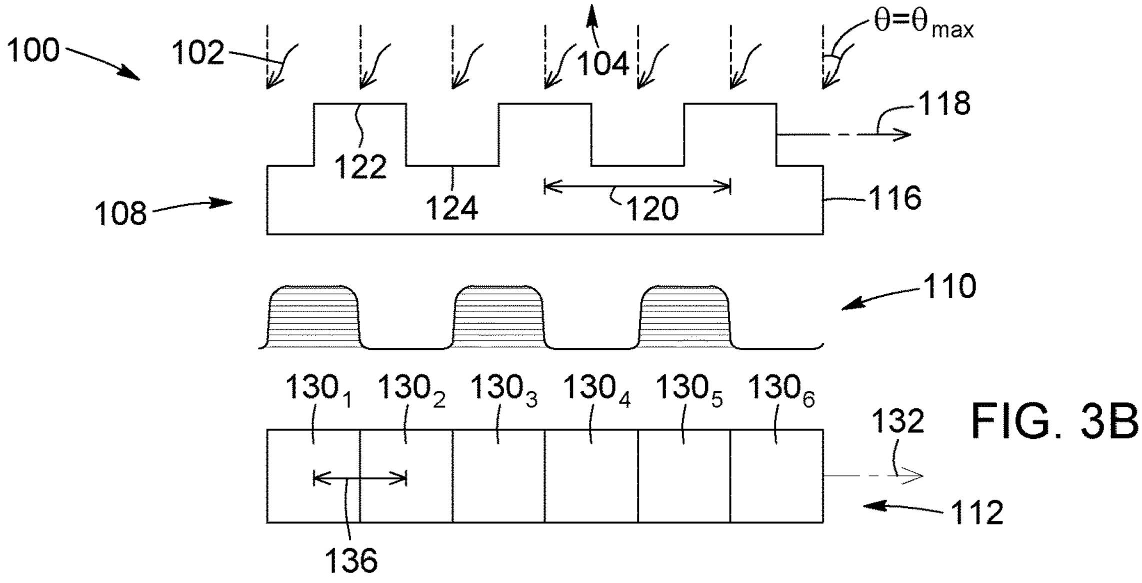
Figure 3C:
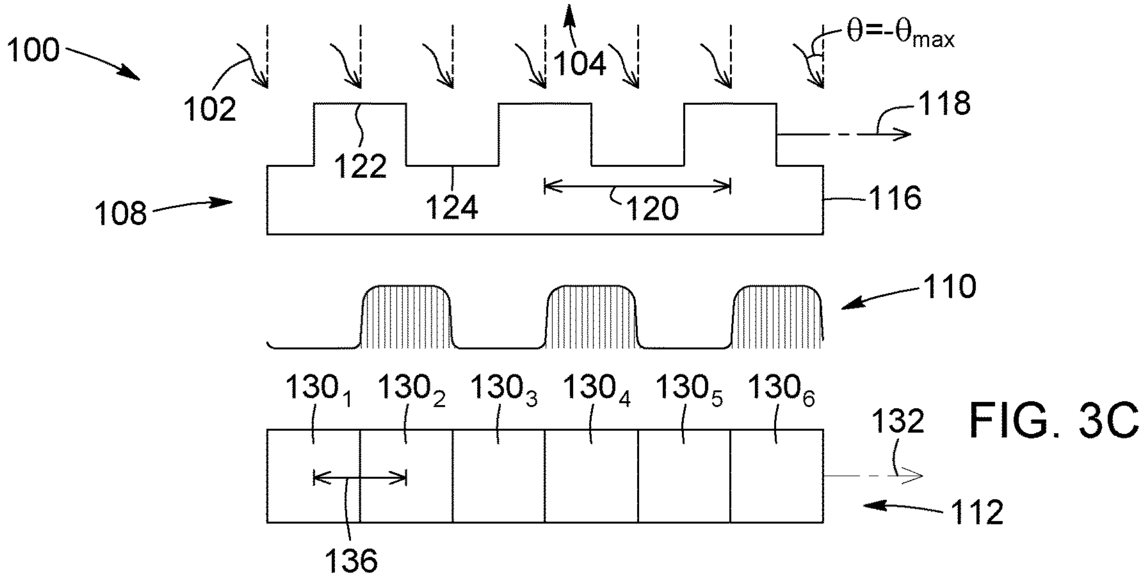

Referring to FIGS. 3A to 3C, the operation of TDM-based imaging systems and how they can be used to provide depth sensing capabilities will be described in greater detail. FIGS. 3A to 3C are schematic representations of an example of a depth imaging system 100 receiving light 102 with three different angles of incidence θ from an observable scene 104 (FIG. 3A: normal incidence, θ=0; FIG. 3B: oblique incidence, $\theta=\theta_{max}>0$; and FIG. 3C: oblique incidence, $\theta=-\theta_{max}<0$). The imaging system 100 includes a TDM 108 and an image sensor 112 disposed under the TDM 108. The TDM 108 includes a binary phase diffraction grating 116 having a grating axis 118 and a grating profile having a grating period 120 and including alternating ridges 122 and grooves 124 with a duty cycle of 50%. The image sensor 112 includes a set of pixels $\mathbf{130_1}$-$\mathbf{130_6}$. The diffraction grating 116 is disposed over the pixels $\mathbf{130_1}$-$\mathbf{130_6}$ such that the center of each ridge 122 is aligned with the midpoint between adjacent ones of the pixels $\mathbf{130_1}$-$\mathbf{130_6}$, and likewise for the center of each groove 124. The grating period 120 is twice as large as the pixel pitch 136.

In operation of the imaging system 100, the diffraction grating 116 receives light 102 from the scene 104 on its input side and diffracts the received light 102 to generate diffracted light 110 on its output side. The diffracted light 110 travels toward the image sensor 112 for detection by the pixels $\mathbf{130_1}$-$\mathbf{130_6}$. The diffracted light 110 has an intensity pattern that is spatially modulated based, inter alia, on the geometrical and optical properties of the diffraction grating 116, the angle of incidence θ of the received light 102, and the position of the observation plane (e.g., the image sensor 112—or an intermediate optical component, such as a microlens array—configured to relay the diffracted light 110 onto the pixels $\mathbf{130_1}$-$\mathbf{130_6}$). In the example illustrated in FIGS. 3A to 3C, the observation plane corresponds to the light-receiving surface defined by the pixels $\mathbf{130_1}$-$\mathbf{130_6}$ of the image sensor 112. The TDM 108 and the image sensor 112 are disposed relative to each other such that the light-receiving surface of the image sensor 112 is positioned in the near-field diffraction region of the diffraction grating 116. For example, in order to detect the diffracted light 110 in the near-field, the separation distance between the grating profile of the diffraction grating 116, where the diffracted light 110 is formed, and the light-receiving surface of the image sensor 112, where the diffracted light 110 is detected, may range between about 0.2 μm and about 20 μm, such as between about 0.5 μm and about 8 μm if the center wavelength of the received light 102 is in the visible range.

The Talbot effect is a near-field diffraction effect in which plane waves incident on a periodic structure, such as a diffraction grating, produce self-images of the periodic structure at regular distances behind the periodic structure. The self-images can be referred to as Talbot images. The main distance at which self-images of the periodic structure are observed due to interference is called the Talbot length $z_T$. In the case of a diffraction grating having a grating period g, the Talbot length $z_T$ may be expressed as follows: $z_T=\lambda/[1-(1-\lambda^2/g^2)^{1/2}]$, where λ is the wavelength of the light incident on the grating. This expression simplifies to $z_T=2g^2/\lambda$ when g is sufficiently large compared to λ. Other self-images are observed at integer multiples of the half-Talbot length, that is, at $nz_T/2$. These additional self-images are either in-phase (if n is even) and out-of-phase (if n is odd) by half of the grating period with respect to the self-image observed at $z_T$. Further sub-images with smaller periods can also be observed at smaller fractional values of the Talbot length. These self-images are observed in the case of amplitude gratings.

In the case of phase gratings, such as the one depicted in FIGS. 3A to 3C, it is the phase of the grating that is self-imaged at integer multiples of the half-Talbot length, which cannot be observed using intensity-sensitive photodetectors, such as photodiodes. As such, a phase grating, unlike an amplitude grating, produces a diffracted wavefront of substantially constant light intensity in an observation plane located at integer multiples of the half-Talbot length. However, phase gratings may also be used to generate near-field intensity patterns similar to Talbot self-images at intermediate observation planes that are shifted from the planes located at integer multiples of the half-Talbot length. For example, such intermediate observation planes may be located at $z_T/4$ and $3z_T/4$. These intensity patterns produced by phase gratings, which are sometimes referred to as Lohmann images, can be detected with intensity-sensitive photodetectors.

In the example illustrated in FIGS. 3A to 3C, the diffraction grating 116 and the image sensor 112 are positioned relative to each other so as to detect these Talbot-like, near-field intensity patterns formed at observation planes corresponding to non-integer multiples of the half-Talbot length (i.e. Lohman images), for example, at $z_T/4$ or $3z_T/4$. In such a case, the diffraction grating 116 is configured to generate, in the observation plane, diffracted light 110 having an intensity pattern that is spatially modulated according to the grating period 120. As depicted in FIGS. 3A to 3C, the intensity pattern of the diffracted light 110 has a spatial period and a shape that match (or relate to) the grating period 120 and the grating profile, respectively. In FIGS. 3A to 3C, the spatial period of the intensity pattern of the diffracted light 110 is substantially equal to the grating period 120. However, in other embodiments, the spatial period of the intensity pattern of the diffracted light 110 may be a rational fraction of the grating period 120, such as half of the grating period 120 in the case of doubled Lohmann images. Each of the pixels $\mathbf{130_1}$-$\mathbf{130_6}$ of the image sensor 112 is configured to sample a respective portion of the intensity pattern of the diffracted light 110 and to generate therefrom a corresponding intensity-based pixel response. In FIGS. 3A to 3C, the horizontally hatched portions of the intensity pattern of the diffracted light 110 are sampled by the odd pixels $\mathbf{130_1}$, $\mathbf{130_3}$, $\mathbf{130_5}$, while the vertically hatched portions are sampled by the even pixels $\mathbf{130_2}$, $\mathbf{130_4}$, $\mathbf{130_6}$.

Another property of Lohmann self-images is that they shift laterally along the grating axis 118 upon varying the angle of incidence θ of the received light 102, while substantially retaining their period and shape. This can be seen from a comparison between the intensity pattern of the diffracted light 110 illustrated in FIGS. 3A to 3C. The diffraction grating 116 is configured to impart an asymmetric angle-dependent spatial modulation to the intensity pattern of the diffracted light 110, which is sampled by the pixels $\mathbf{130_1}$-$\mathbf{130_6}$. By controlling (i) the lateral alignment between the diffraction grating 116 and the image sensor 112 and (ii) the relationship between the grating period 120 and the pixel pitch 136, the intensities measured by the individual pixels $\mathbf{130_1}$-$\mathbf{130_6}$ for a given intensity of the received light 102 will vary as a function of the angle of incidence θ due to the lateral shifts experienced by the diffracted light 110. For example, in FIGS. 3A to 3C, the intensities measured by the odd pixels $\mathbf{130_1}$, $\mathbf{130_3}$, $\mathbf{130_5}$ are respectively equal to (FIG. 3A), greater than (FIG. 3B), and less than (FIG. 3C) the intensities measured by the even pixels $\mathbf{130_2}$, $\mathbf{130_4}$, $\mathbf{130_6}$. The angle-dependent information encoded by the diffraction grating 116 into the intensity pattern of the diffracted light 110 is recorded by the image sensor 112 as a set of individual intensity-based pixel responses, which can be processed to provide depth information about the scene 104.

Figure 4:
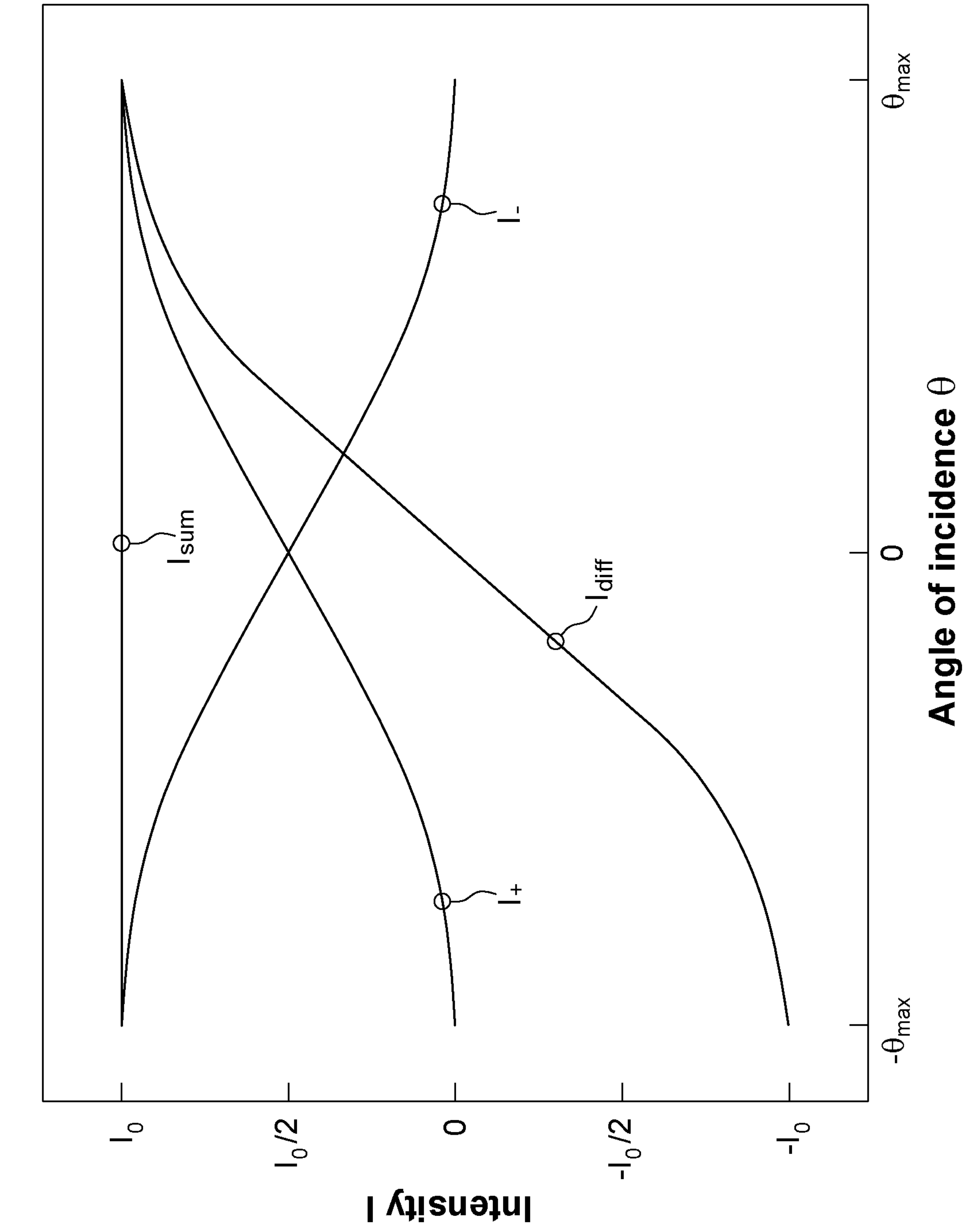
FIG. 4 is a graph depicting curves of the individual pixel responses of the odd pixels ($I_+$) and the even pixels ($I_-$) of the imaging system illustrated in FIGS. 3A to 3C, plotted as functions of the angle of incidence $\theta$, for a given intensity of incident light.

Referring to FIG. 4, there are depicted curves of the individual pixel responses of the odd pixels $\mathbf{130_1}$, $\mathbf{130_3}$, $\mathbf{130_5}$ ($I_+$) and the even pixels $\mathbf{130_2}$, $\mathbf{130_4}$, $\mathbf{130_6}$ ($I_-$) of FIGS. 3A to 3C, plotted as functions of the angle of incidence θ, for a given intensity of incident light. FIG. 4 assumes that the intensity of the incident light is equal to $I_0$ and that there is a modulation depth of substantially 100% between $\theta=\pm\theta_{max}$, where the maxima of the diffracted intensity pattern are centered on either the odd pixels $\mathbf{130_1}$, $\mathbf{130_3}$, $\mathbf{130_5}$ or the even pixels $\mathbf{130_2}$, $\mathbf{130_4}$, $\mathbf{130_6}$ (peak modulated level), and θ=0, where the maxima of the diffracted intensity pattern are centered on the transitions between the odd pixels $\mathbf{130_1}$, $\mathbf{130_3}$, $\mathbf{130_5}$ or the even pixels $\mathbf{130_2}$, $\mathbf{130_4}$, $\mathbf{130_6}$ (unmodulated level). It is seen that $I_+$ and $I_-$ have complementary asymmetrical angular responses, where $I_+(\theta)=I_-(-\theta)$ and where $I_+$ and $I_-$ respectively increases and decreases as θ increases. FIG. 4 also depicts curves of the sum $I_{sum}=I_++I_-$ and the difference $I_{diff}=I_+-I_-$ of the odd and even pixel responses as functions of θ.

It is appreciated that since the intensities $I_+$ and $I_-$ vary in a complementary way as a function of θ, their sum $I_{sum}$ remains, in principle, independent of θ. In practice, $I_{sum}$ can be controlled to remain largely independent of θ, or at least symmetrical with respect to θ (i.e., so that $I_{sum}(\theta)=I_{sum}(-\theta)$). The summed pixel response, $I_{sum}$, is similar to the signal that would be obtained by the pixels $\mathbf{130_1}$-$\mathbf{130_6}$ in the absence of the diffraction grating 116. In particular, $I_{sum}$ can provide 2D intensity image information, with no or little angle-dependent information encoded therein. The differential pixel response, $I_{diff}$, varies asymmetrically as a function of θ and represents a measurement of the angle-of-incidence information encoded into the diffracted light 110 by the diffraction grating 116. The pixel responses $I_+$, $I_-$, $I_{sum}$, and $I_{diff}$ may be expressed mathematically as follows:

$$I_\pm(\theta) = \frac{I_0}{2}[1 \pm m\sin(\beta\theta)], \tag{1}$$

$$I_{sum} = I_0, \tag{2}$$

$$I_{diff}(\theta) = I_0 m\sin(\beta\theta), \tag{3}$$

where $I_0$ is the intensity of the incident light, m is a modulation depth parameter, and β is an angular sensitivity parameter. For example, in FIG. 4, m=1 and $\beta=\pi/(2\theta_{max})$. It is noted that while the expressions for the intensity-based pixel responses $I_+$ and $I_-$ in Equation (1) are only approximate, they can provide convenient analytical expressions to describe how $I_+$ and $I_-$ may vary as a function of the angle of incidence.

Equation (2) implies that each summed pixel response $I_{sum}$ is obtained by summing one odd pixel response $I_+$ and one even pixel response $I_-$, and Equation (3) implies that each differential pixel response $I_{diff}$ is obtained by subtracting one even pixel response $I_-$ from one odd pixel response $I_+$. Such an approach may be viewed as a 2×1 binning mode. However, other approaches can be used to determine the summed and differential pixel responses $I_{sum}$ and $I_{diff}$. Non-limiting examples include a 2×2 binning mode (e.g., $I_{sum}=I_{1+}+I_{1-}+I_{2+}+I_{2-}$ and $I_{diff}=I_{1+}-I_{1-}+I_{2+}-I_{2-}$, where $I_{1\pm}$ is a first pair of odd and even pixel responses and $I_{2\pm}$ is an adjacent second pair of odd and even pixel responses), or a convolution mode (e.g., using a kernel such that $I_{sum}$ and $I_{diff}$ have the same pixel resolution as $I_+$ and $I_-$). In this regard, the term "differential" is used herein to denote not only a subtraction between two pixel responses, but also a more complex or elaborate difference-based operation from which a difference between two or more pixel responses is obtained. Likewise, the term "summed" is used herein to denote not only a sum between two pixel responses, but also a more complex or elaborate sum-based operation from which a sum between two or more pixel responses is obtained. Furthermore, although the example of FIGS. 3A to 3C defines two groups of pixels 130 with different pixel responses as a function of the angle of incidence (i.e., the odd pixels $\mathbf{130}_1$, $\mathbf{130}_3$, $\mathbf{130}_5$ and the even pixels $\mathbf{130}_2$, $\mathbf{130}_4$, $\mathbf{130}_6$), other embodiments may define groups composed of more than two pixels with different angular responses.

The summed and differential pixel responses, $I_{sum}$ and $I_{diff}$, may be processed to provide depth information about the scene 104. In some embodiments, the summed and differential pixel responses $I_{sum}$ and $I_{diff}$ from all the odd-even pixel pairs or groups may be used to provide a TDM disparity map. The TDM disparity map is made of a set of TDM disparities, d, one for each odd-even pixel pair or group (or TDM pixel pair or group). The TDM disparity map is representative of the difference between the viewpoint of the scene 104 provided by the odd pixels $\mathbf{130}_1$, $\mathbf{130}_3$, $\mathbf{130}_5$ and the viewpoint of the scene 104 provided by the even pixels $\mathbf{130}_2$, $\mathbf{130}_4$, $\mathbf{130}_6$. Stated otherwise, the odd pixel responses $I_+$ and the even pixel responses $I_-$ can provide two slightly different views of the scene 104, separated by an effective TDM baseline distance. The TDM baseline distance can depend on the modulation depth parameter m, the angular sensitivity parameter β, and the numerical aperture of the imaging lens 106 (e.g., the lens diameter). It is appreciated that the TDM baseline distance is generally smaller than stereoscopic baseline distances of conventional stereoscopic imaging systems (e.g., including a pair of imaging devices or cameras). The TDM disparity map can be processed to yield depth information (e.g., a depth map) about the scene 104.

Returning to FIGS. 1 and 2, the pixels 130 of the image sensor 112 can be said to include odd pixels $\mathbf{130}_O$ and even pixels $\mathbf{130}_E$, which are respectively designated by the letters "O" and "E" in FIGS. 1 and 2. In some applications, the odd pixels $\mathbf{130}_O$ can be referred to as "first pixels", while the even pixels $\mathbf{130}_E$ can be referred to as "second pixels". The odd pixels $\mathbf{130}_O$ and the even pixels $\mathbf{130}_E$ are configured to sample complementary portions of the diffracted light 110 over a full period thereof. The pixel responses $I_+$ of the odd pixels $\mathbf{130}_O$ and the pixel responses $I_-$ of the even pixels $\mathbf{130}_E$ may be described by Equation (1). Using Equations (2) and (3), the set of odd pixel responses $I_+$ (also referred to herein as the "first set of pixel responses") and the set of even pixel responses $I_-$ (also referred to herein as the "second set of pixel responses") can be used to compute a set of summed pixel responses $I_{sum}$ and a set of differential pixel responses $I_{diff}$. The computer device 114 may be configured to determine depth information about the scene 104 from the set of summed pixel responses $I_{sum}$ and the set of differential pixel responses $I_{diff}$, for example, by computing a set of TDM disparities $d_{TDM}$. In some embodiments, the set of TDM disparities $d_{TDM}$ obtained from all the TDM pixel pairs of the TDM 108 can be used to generate a TDM disparity map.

In some embodiments, the computer device 114 may be configured to determine depth information about the scene 104 from the set of odd and even pixel responses $I_+$ and $I_-$ by computing a set of TDM disparities $d_{TDM}$ and obtaining therefrom a TDM disparity map. In such embodiments, the TDM disparity map may be obtained without a set of summed pixel responses $I_{sum}$ and a set of differential pixel responses $I_{diff}$. For example, the computation of the TDM disparity map may use a stereoscopic matching method between a first image formed by the set of odd pixel responses $I_+$ and a second image formed by the set of even pixel responses $I_-$. In some embodiments, the first image may be referred to as an odd or a left image, and the second image may be referred to as an even or right image. Stereoscopic matching methods aim to solve the problem of finding matching pairs of corresponding image points from two images of the same scene acquired from different viewpoints in order to obtain a disparity map from which depth information about the scene can be determined. Using epipolar image rectification to constraint corresponding pixel pairs to lie on conjugate epipolar lines can reduce the problem of searching for corresponding image points from a two-dimensional search problem to a one-dimensional search problem. Under the epipolar constraint, the linear, typically horizontal, pixel shift or distance between points of a corresponding image pair defines the stereoscopic disparity. It is appreciated that although using epipolar image rectification can simplify the stereoscopic correspondence problem, conventional stereoscopic matching methods can remain computationally expensive and time-consuming.

Figure 5:
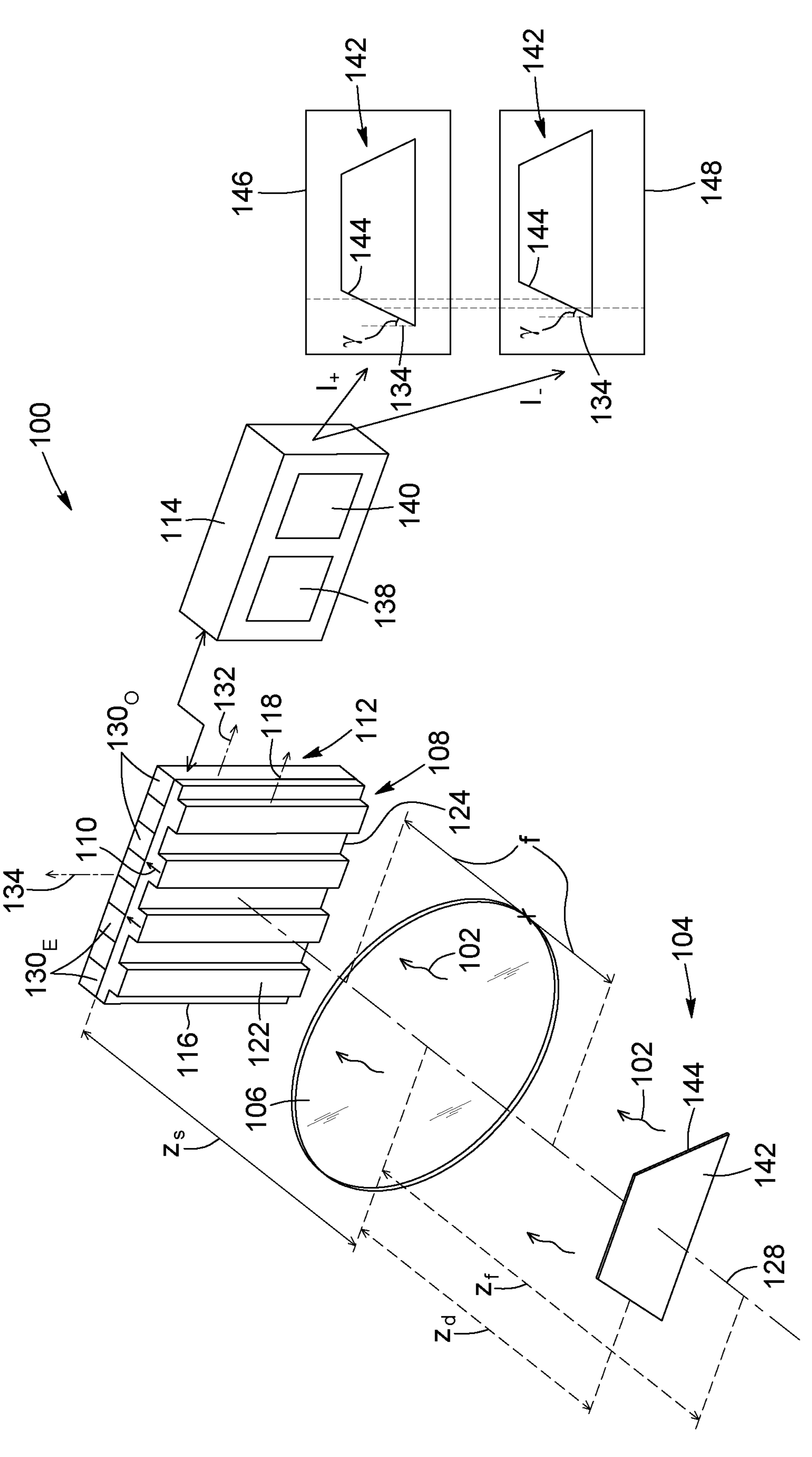
FIG. 5 is a schematic perspective view of a depth imaging system, in accordance with another embodiment.

The TDM disparity $d_{TDM}$ conveys relative depth information about the scene 104 but it generally does not directly provide absolute depth information. Referring to FIG. 5, there is provided a schematic representation of an embodiment of a TDM-based imaging system 100 for capturing image data representative of light 102 received from a scene 104. The structure, configuration, and operation of the TDM-based imaging system 100 depicted in FIG. 5 can be similar to those described above with respect to FIGS. 1 and 2. The imaging system 100 of FIG. 5 generally includes an imaging lens 106, a TDM 108, an image sensor 112, and a computer device 114. The TDM 108 is configured to diffract the light 102 from the scene 104 to generate diffracted light 110. The image sensor 112 is configured to detect the diffracted light 110. The image sensor 112 includes a set of odd pixels $\mathbf{130}_O$ and a set of even pixels $\mathbf{130}_E$. The set of odd pixels $\mathbf{130}_O$ is configured to generate a set of odd pixel responses $I_+$ and the set of even pixels $\mathbf{130}_E$ is configured to generate a set of even pixel responses $I_-$. The odd pixel responses $I_+$ and the even pixel responses $I_-$ vary differently from each other as a function of the angle of incidence of the received light 102 (see, e.g., FIG. 4). The computer device 114 is configured to generate a first image 146 from the set of odd pixel responses $I_+$ and a second image 148 from the set of even pixel responses $I_-$.

In some embodiments, the absolute depth $z_d$ of an object 142 in the scene 104 can be related to the TDM disparity $d_{TDM}$ as follows:

$$d_{TDM} = S_{TDM}\left(\frac{1}{z_d} - \frac{1}{z_f}\right), \tag{4}$$

where $S_{TDM}$ is a depth sensitivity parameter associated with the TDM 108, and $z_f$ is the focus distance of the imaging system 100. The term "object" refers herein to any physical entity present in a scene, whether animate or inanimate. Equation (4) relates relative depth information, contained in $d_{TDM}$, to absolute depth information, contained in $z_d$. The depth sensitivity parameter $S_{TDM}$ can depend on various factors including, but not limited to, different parameters of the imaging lens 106 (e.g., focal length, f-number, optical aberrations), the shape and amplitude of the angular response of the TDM 108, the size of the pixels 130$_O$-130$_E$, and the wavelength and polarization of the incoming light 102. The depth sensitivity parameter $S_{TDM}$ may be determined by calibration. The focus distance $z_f$ is the distance along the optical axis 128 computed from the center of the imaging lens 106 to the focal plane, which is the object plane that is imaged in-focus at the sensor plane of the image sensor 112. The sensor plane is at a distance $z_s$ from the center of the imaging lens 106. The focus distance $z_f$ and the lens-to-sensor distance $z_s$ may be related by the thin-lens equation as follows:

$$\frac{1}{f}=\frac{1}{z_s}+\frac{1}{z_f}, \tag{5}$$

where f is the focal length of the imaging lens 106. In some embodiments, the focal length f may range from about 1 mm to about 50 mm, the lens-to-sensor distance $z_s$ may range from about 1 mm to about 50 mm, and the focus distance $z_f$ may range from about 1 cm to infinity. In some embodiments, the lens-to-sensor distance $z_s$ may be slightly longer than the focal length f, and the focus distance $z_f$ may be significantly longer than both the focal length f and the lens-to-sensor distance $z_s$.

Figure 6:
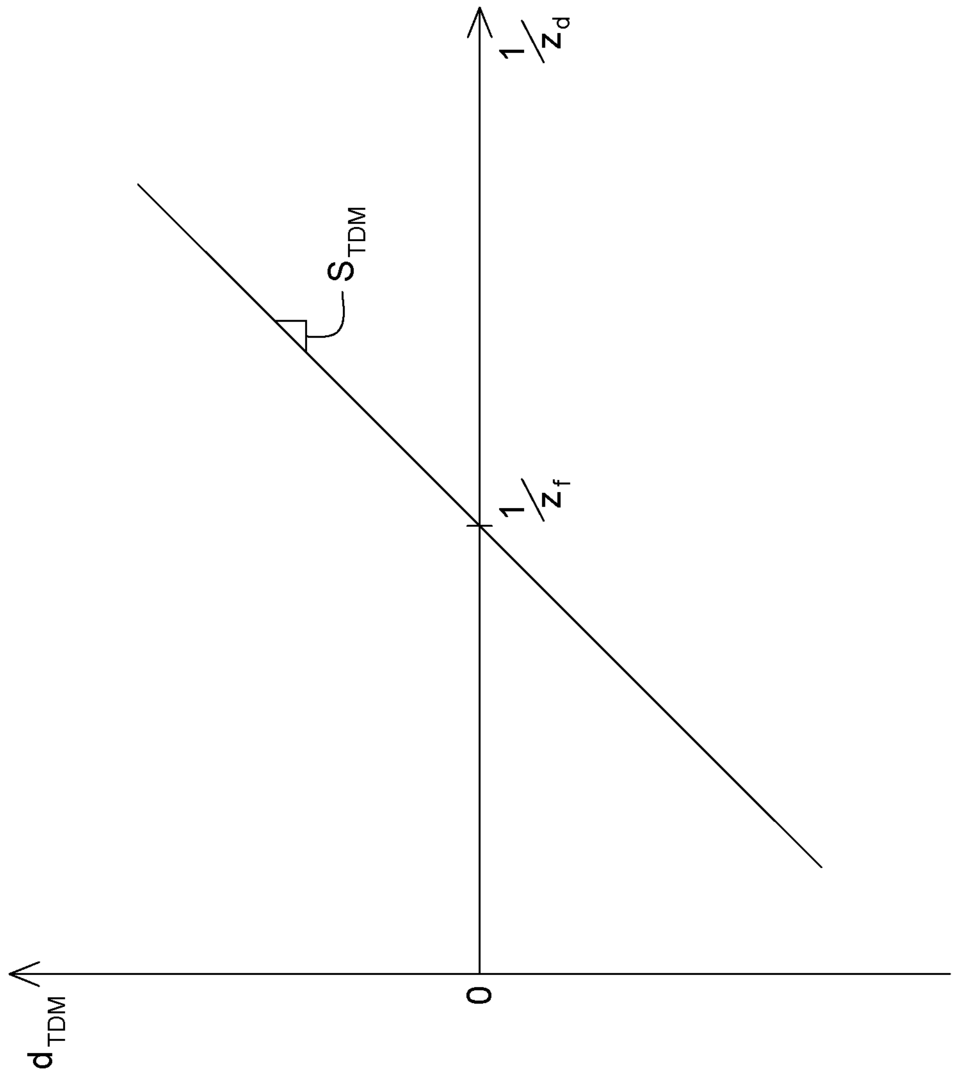
FIG. 6 is a graph depicting a curve of disparity plotted as a function of the inverse of object distance, which can be obtained using a TDM-based depth imaging system such as disclosed herein.

FIG. 6 is graph depicting a curve of the TDM disparity $d_{TDM}$ given by Equation (4) and plotted as a function of the inverse of the object distance, $1/z_d$. In this example, the TDM disparity $d_{TDM}$ is linearly proportional to $1/z_a$, with a slope of $S_{TDM}$, and equal to zero when $z_d=z_f$. Also, the larger magnitude of $d_{TDM}$, the farther the object 142 is from the focal plane at $z_f$. The TDM disparity $d_{TDM}$ is positive when the object 142 is behind the focal plane and negative when the object 142 is in front of the focal plane. It is appreciated that, in practice, the curve of $d_{TDM}$ versus $1/z_a$ may deviate from the ideal curve depicted FIG. 6, for example, by following a profile that is not strictly linear. In operation, the TDM disparity $d_{TDM}$ may be derived from pixel response measurements and used to determine the object distance $z_d$ by comparison with calibration data relating $d_{TDM}$ to $z_d$ over a certain range of object distances for one or more values of focus distance $z_f$. The calibration data may include calibration curves and lookup tables.

Returning to FIG. 5, in some embodiments, the absolute depth $z_d$ of an object 142 in a scene 104 can be detected over one or more edges 144 on the object 142. In the present description, the term "edge" refers to any local variation, change, transition, or discontinuity in intensity, color, brightness, or contrast in the scene 104, which can be detected in image data captured by the imaging system 100. For example, the edge 144 schematically depicted in FIG. 5 can be a texture or pattern on the object 142, a transition between the object 142 and the foreground or background of the scene 104 (e.g., the periphery of the object 142), a texture or pattern projected on the object 142 by a light source, or the like. The edge 144 can be characterized by an orientation γ. In the present description, the term "edge orientation" is used to refer to the angle that an edge within an image makes with respect to a reference direction. In FIG. 5, the reference direction corresponds to the pixel axis 134 perpendicular to the grating axis 118, but other reference directions can be used in other embodiments (e.g., the first pixel axis 132)

The TDM disparity map is representative of the difference between the viewpoint of the scene 104 provided by the odd pixels 130$_O$ and the viewpoint of the scene 104 provided by the even pixels 130$_E$. These two viewpoints are separated by an effective TDM baseline distance, which is usually assumed to be parallel to the grating axis 118 (and thus to the first pixel axis 132). However, this assumption may not hold in some situations. In such situations, the orientation of the TDM baseline with respect to the grating axis 118 may have to be considered to provide a more reliable determination of the TDM disparity $d_{TDM}$. This is because if the TDM baseline orientation is not taken into account, the computation of the TDM disparity $d_{TDM}$ of an object 142 based on an edge 144 of the object 142 may depend on the orientation of the edge 144 with respect to the grating axis 118, which, if not accounted for, may adversely affect the accuracy of the depth $z_d$ of the object 142 estimated from $d_{TDM}$ using Equation (4).

In some embodiments, Equation (4) can be generalized as follows to take into account the possibility that the TDM baseline may not be parallel to the grating axis 118 (i.e., the nominal or intended baseline direction):

$$\vec{d}_{TDM}=d_{TDM}(\cos(\sigma)\hat{x}+\sin(\sigma)\hat{y})=d_x\hat{x}+d_y\hat{y}=(S_x\hat{x}+S_y\hat{y})\left(\frac{1}{z_d}-\frac{1}{z_f}\right)+\Delta_y\hat{y}, \tag{6}$$

where $\vec{d}_{TDM}$ is the vectorial TDM disparity of magnitude $d_{TDM}$ and direction parallel to the TDM baseline, which makes an angle σ≠0 with respect to the grating axis 118; $\hat{x}$ and $\hat{y}$ are unit vectors respectively parallel and perpendicular to the grating axis 118; $d_x=d_{TDM}\cos(\sigma)$ and $d_y=d_{TDM}\sin(\sigma)$ are the x and y components of $\vec{d}_{TDM}$, respectively; $S_x$ and $S_y$ are the x and y depth sensitivity parameters associated with the TDM 108, respectively, where $S_x$ is generally significantly larger than $S_y$; and $\Delta_y$ is a constant offset parameter along the y direction. In particular, $S_x$ and $S_y$ are the depth sensitivity parameters along and transverse to the nominal baseline direction of the TDM 108, respectively.

Ideally, the depth imaging system 100 would be expected to have σ=0, and thus $S_y=0$ and $\Delta_y=0$. In such a case, Equation (6) would reduce to Equation (4) with $S_x=S_{TDM}$. In practice, lens aberrations, lens numerical aperture variations over the image plane, changes in chief ray angle distribution, or any other sources of asymmetry in the depth imaging system may lead to $S_y\neq0$ and/or $\Delta_y\neq0$. In such a case, the four parameters $S_x$, $S_y$, $z_f$, and $\Delta_y$ can be modeled or determined by calibration to relate the vectorial TDM disparity $\vec{d}_{TDM}$ (e.g., $d_x$ and $d_y$) computed from captured image data to the depth $z_d$ of an object 142 in the scene 104.

In some embodiments, the vectorial TDM disparity $\vec{d}_{TDM}$ may be determined from the set of odd and even pixel responses $I_+$ and $I_-$ by using a stereoscopic matching method. However, due to the vectorial nature of the TDM disparity $\vec{d}_{TDM}$, the use of epipolar image rectification to reduce the two-dimensional search problem to a one-dimensional search problem is often impractical, if not impossible. It is also appreciated that two-dimensional search problems can be computationally expensive and time-consuming.

In some embodiments, rather than determining the vectorial TDM disparity $\vec{d}_{TDM}$, it is more efficient or practical to determine a disparity parameter referred to herein as the "parallel disparity", and denoted by $d_{\parallel}$. In the present description, the parallel disparity $d_{\parallel}$ is defined as the distance, measured in image space along a disparity axis parallel to the grating axis 118 (and thus to the first pixel axis 132), between two positions: (i) the position of a point of an edge 144 as viewed in a first image 146 formed by the set of odd pixel responses $I_+$, and (ii) the position of a point of the same edge 144 as viewed in a second image 148 formed by the set of even pixel responses $I_-$.

Figure 7A:
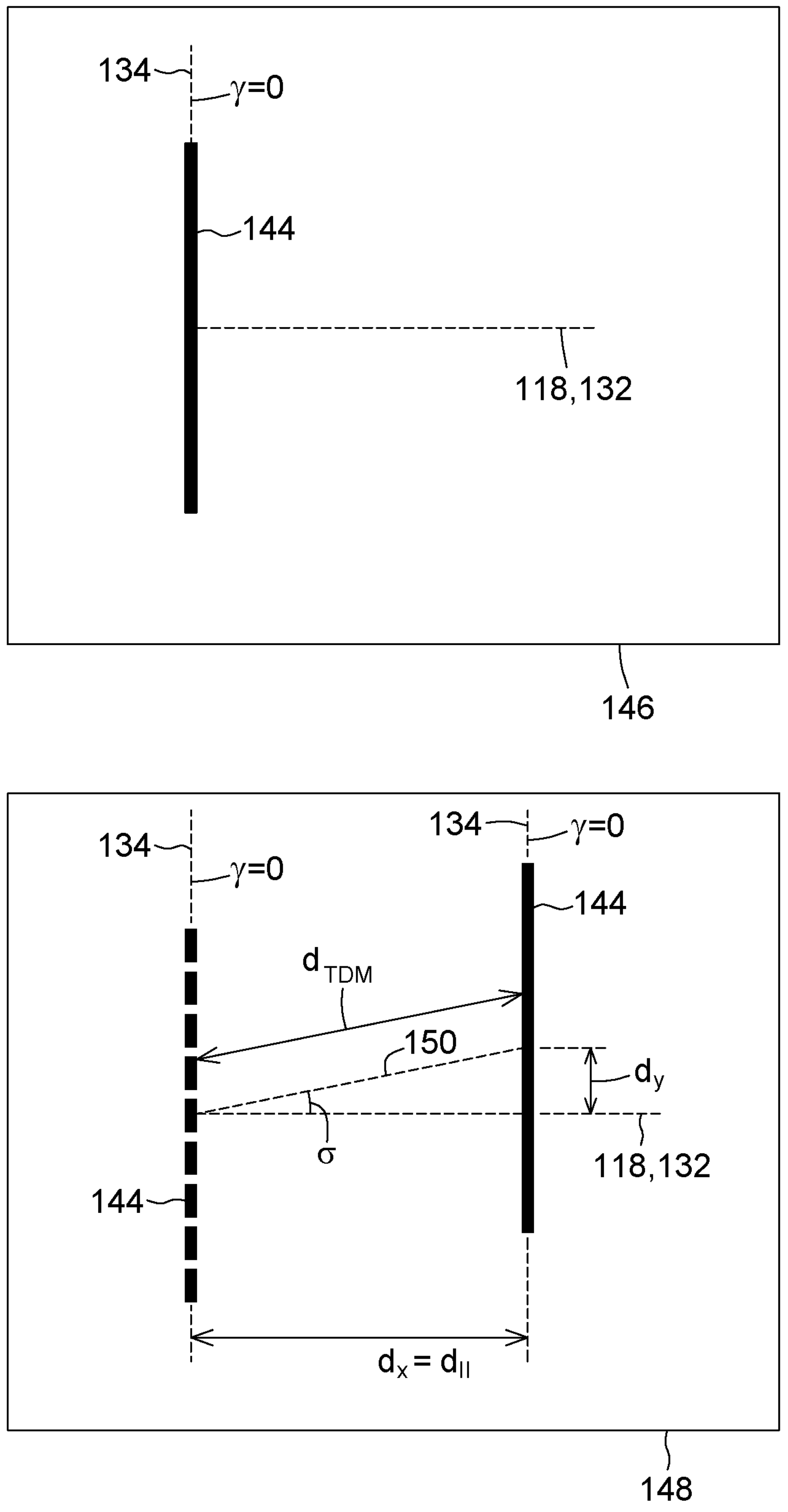
FIGS. 7A to 7C are schematic representations of TDM image pairs, each of which depicting an edge having a different edge orientation $\gamma$ with respect to a pixel axis perpendicular to the grating axis
Figure 7B:
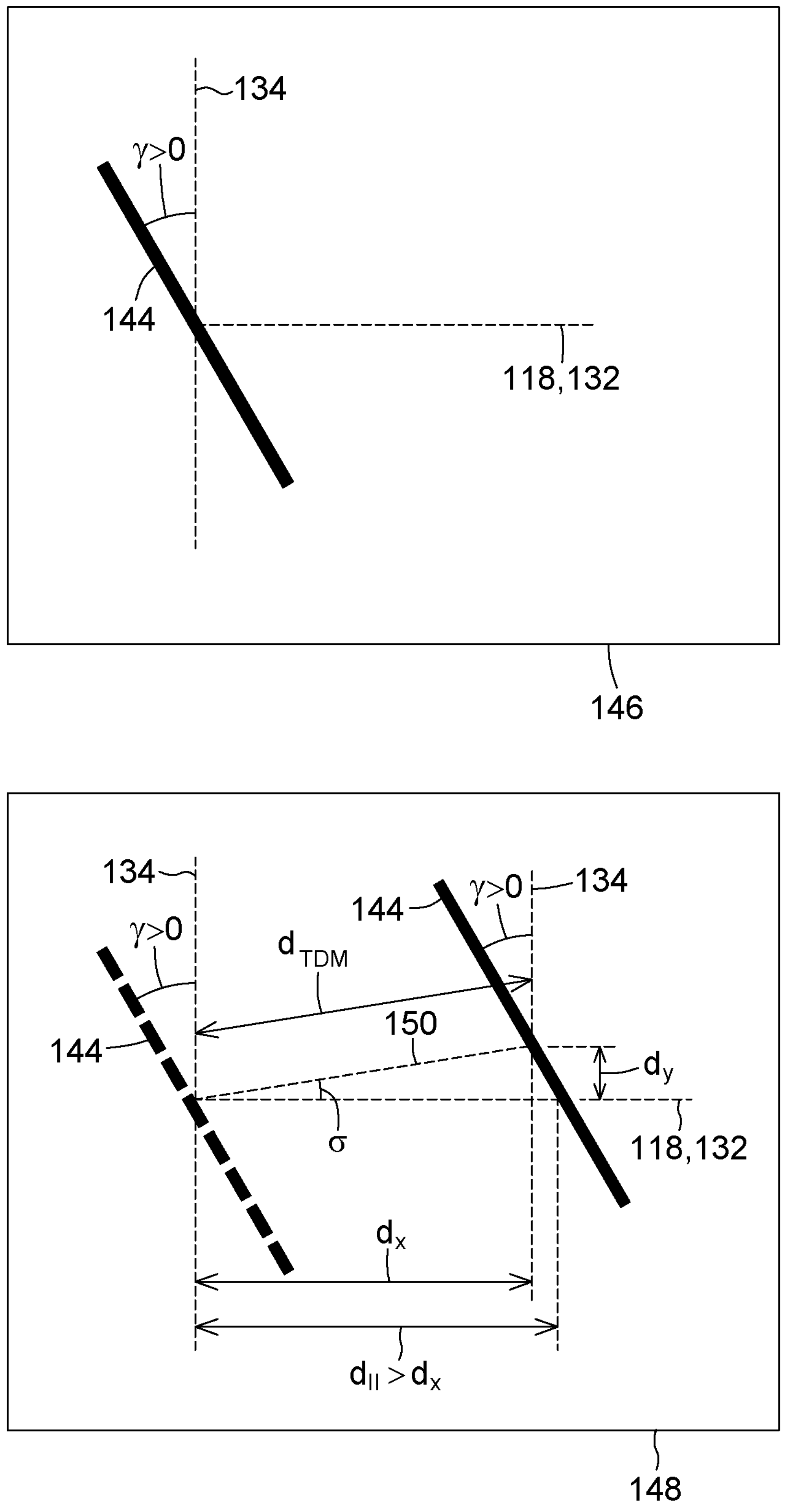
Figure 7C:
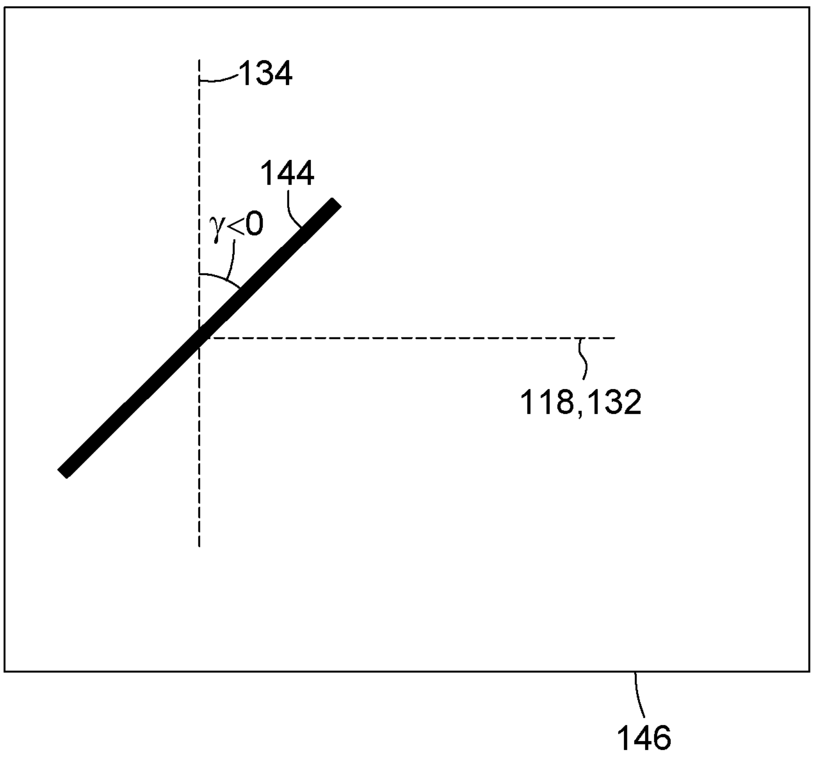
Figure 7C:
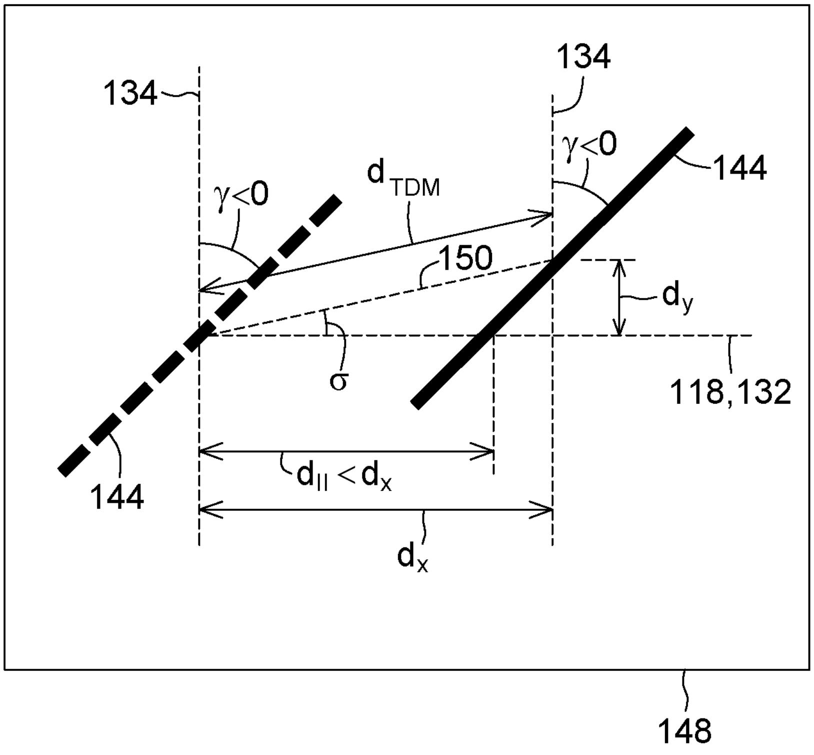

This is illustrated in FIGS. 7A to 7C, which are schematic representations of three TDM image pairs, each of which including a first image 146 and a second image 148 depicting an edge 144 having a different edge orientation $\gamma$ with respect to a pixel axis 134 perpendicular to the grating axis 118 (FIG. 7A: $\gamma=0$; FIG. 7B: $\gamma>0$; and FIG. 7C: $\gamma<0$). In each of FIGS. 7A to 7C, the first image 146 and the second image 148 have a vectorial TDM disparity $d_{TDM}$ between them along a TDM disparity baseline 150 that makes an angle $\sigma\neq0$ with respect to the grating axis 118 (and thus with respect to the first pixel axis 132). FIGS. 7A to 7C also depict the parallel disparity $d_{\|}$. By geometry, it can be shown that the parallel disparity $d_{\|}$ can be related to $d_{TDM}$, $\sigma$, and $\gamma$ as follows:

$$d_{\|} = d_x + d_y\tan(\gamma) = d_{TDM}[\cos(\sigma) + \sin(\sigma)\tan(\gamma)] = d_{TDM}\left[\frac{\cos(\sigma-\gamma)}{\cos(\gamma)}\right], \tag{7}$$

where $\sigma$ and $\gamma$ are defined as positive counterclockwise (FIGS. 7A to 7C for $\sigma$; FIG. 7B for $\gamma$) and negative clockwise (FIG. 7C for $\gamma$).

From FIGS. 7A to 7C and Equation (7), it is appreciated that compared to the case depicted in FIG. 7A, where $\gamma=0$ and $d_{\|}=d_x$, the parallel disparity $d_{\|}$ increases when $\gamma>0$ (FIG. 7B, where $d_{\|}>d_x$) and decreases when $\gamma<0$ (FIG. 7C, where $d_{\|}<d_x$). It is also appreciated that since $\sigma\neq0$, the parallel disparity $d_{\|}$ is computed not from corresponding edge points in the first and second images 146, 148, but from nearest edge points as measured along a line parallel to the grating axis 118 (and thus to the first pixel axis 132).

In some embodiments, the computer device 114 may be configured to determine depth information about the scene 104 by performing steps of (i) computing a set of summed pixel responses $I_{sum}$ and a set of differential pixel responses $I_{diff}$ from the set odd pixel responses $I_+$ and the set of even pixel responses $I_-$ [e.g., using Equations (2) and (3)]; (ii) computing a set of parallel disparities $d_{\|}$ from $I_{sum}$ and $I_{diff}$ to obtain a parallel disparity map; and (iii) determining depth information about the scene from the parallel disparity map. From Equations (6) and (7), the parallel disparity $d_{\|}$ and the TDM baseline angle $\sigma$ can be expressed as follows:

$$d_{\|} = (S_x + S_y\tan(\gamma))\left(\frac{1}{z_d} - \frac{1}{z_f}\right) + \Delta_y\tan(\gamma), \tag{8}$$

$$\tan(\sigma) = \frac{S_y}{S_x} + \frac{\Delta_y}{S_x\left(\frac{1}{z_d} - \frac{1}{z_f}\right)}. \tag{9}$$

It is appreciated from Equation (9) that the angle $\sigma$ of the TDM baseline 150 varies with the object distance $z_d$ if $\Delta_y\neq0$. However, if $\Delta_y=0$, $\tan(\sigma)=S_y/S_x$, and thus the TDM baseline 150 is constant and independent of $z_d$.

Figure 8A:
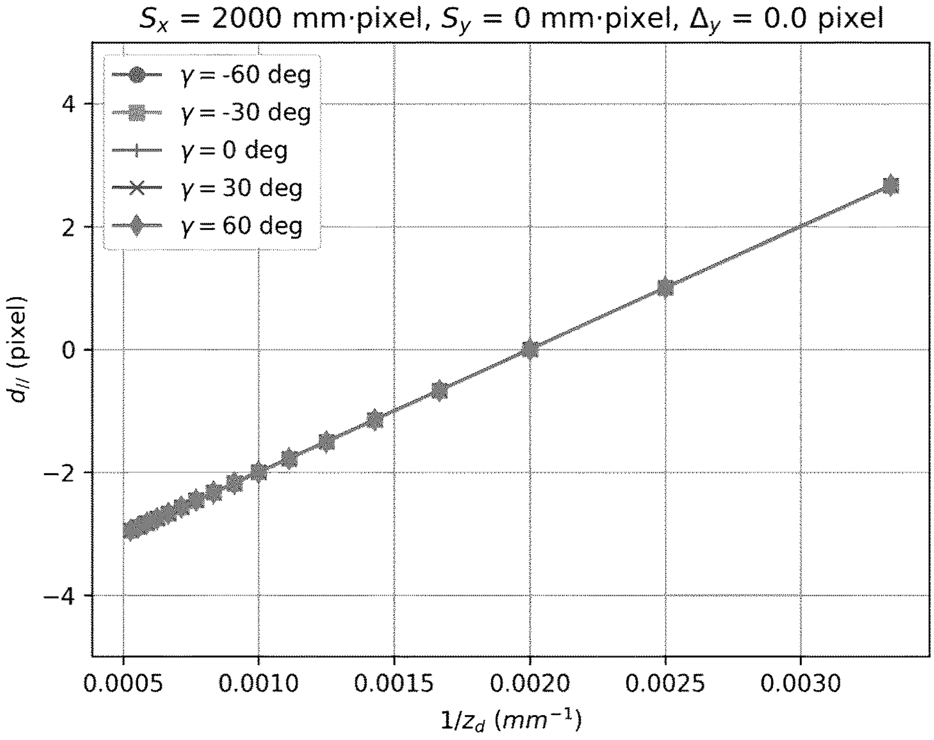
FIGS. 8A to 8D are graphs of depth calibration curves of the parallel disparity $d_{\|}$, plotted as functions of the inverse objective distance $1/z_d$ for different values of the edge angle γ (−60°, −30°, 0°, 30°, 60 in each of FIGS. 8A to 8D), the depth sensitivity parameter $S_y$
Figure 8B:
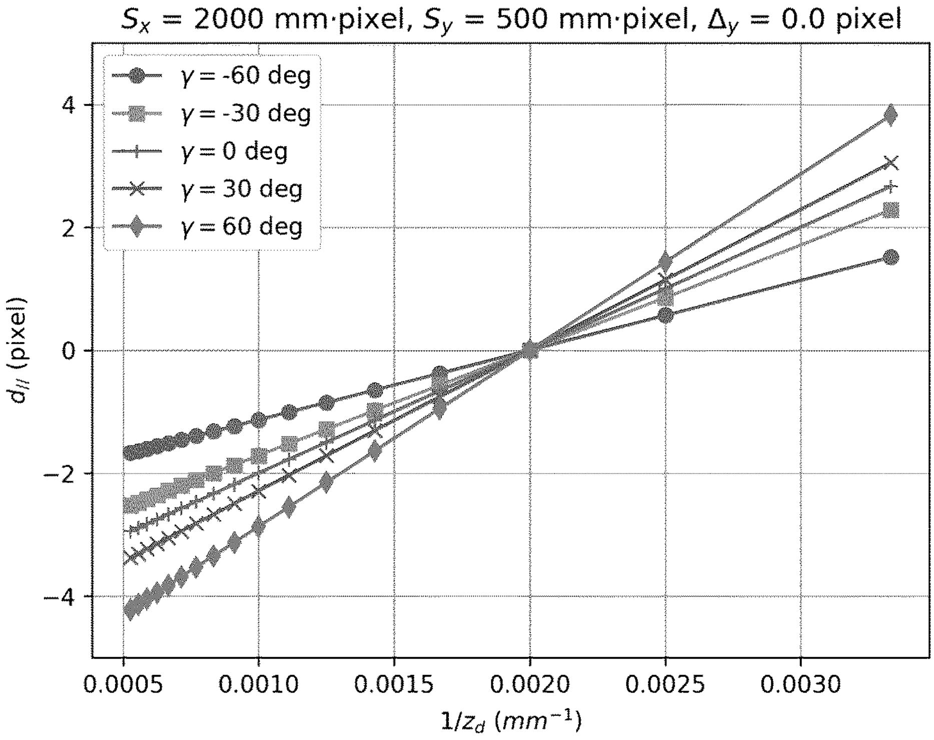
Figure 8C:
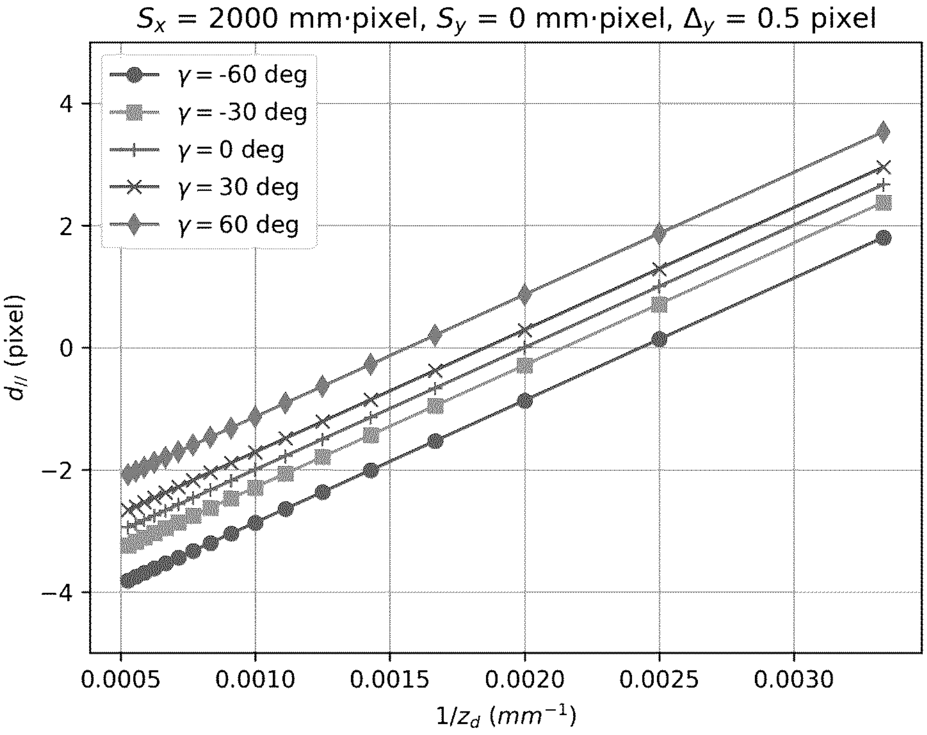
Figure 8D:
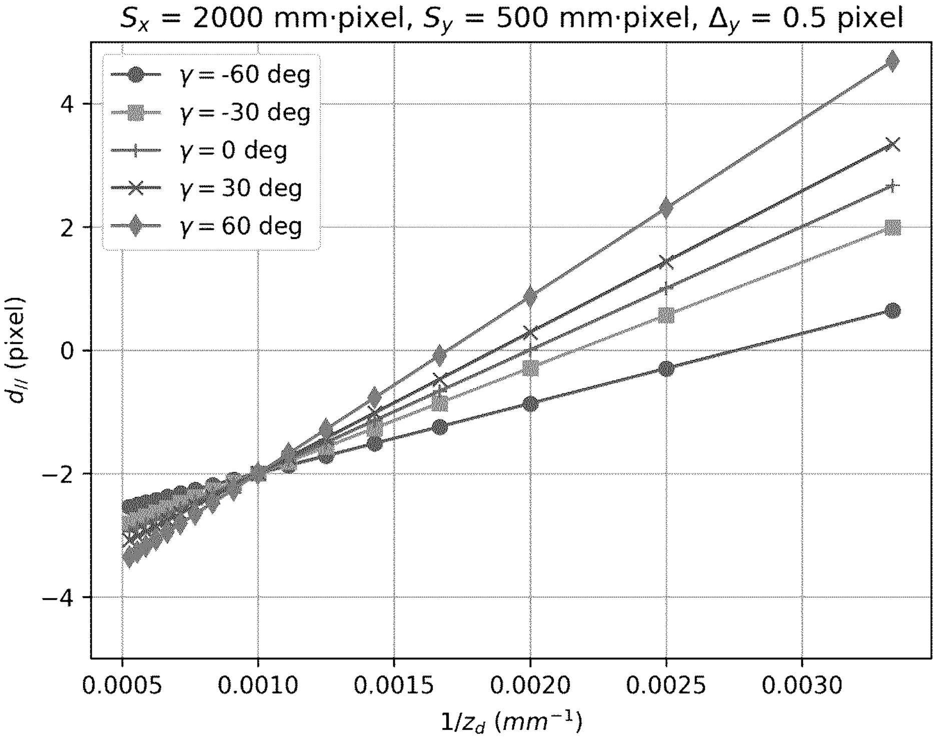

Referring to FIGS. 8A to 8D, there are shown graphs of depth calibration curves of the parallel disparity $d_{\|}$, plotted as functions of $1/z_d$ for different values of the edge angle $\gamma$ (−60°, −30°, 0°, 30°, 60 in each of FIGS. 8A to 8D), the depth sensitivity parameter $S_y$ (FIGS. 8A and 8C: $S_y=0$; FIGS. 8B and 8D: $S_y\neq0$), and the offset parameter $\Delta_y$ (FIGS. 8A and 8B: $\Delta_y=0$; FIGS. 8C and 8D: $\Delta_y\neq0$). In FIG. 8A, $S_y=0$ and $\Delta_y=0$, and the five depth calibration curves corresponding to the five edge angle values are superimposed one top of the other. This result indicates that the parallel disparity d does not vary with the edge angle $\gamma$ when the TDM baseline angle $\sigma=0$. That is, there is no error on d associated with the edge orientation, and thus $d_{TDM}=d_{TDM}\hat{x}$, with $d_{TDM}=d_x=d_{\|}$.

FIGS. 8B to 8D show that when the TDM baseline angle $\sigma\neq0$ [i.e., because $S_y\neq0$ and/or $\Delta_y\neq0$; see Equation (8)], different values of edge angle $\gamma$ yield different values of parallel disparity d for the same value of $1/z_d$. This means that multiple values of $d_{\|}$ are a priori compatible with a given ground truth value of $1/z_d$ during calibration. This also means that multiple values of $1/z_d$ are a priori compatible with a value of $d_{\|}$ determined from captured image data during deployment. It is appreciated that the spread of the depth calibration curves along the disparity axis at a given value of $1/z_a$ represents the error or uncertainty on $d_{\|}$ due to the edge angle $\gamma$. Larger absolute values of $S_y$ and/or $\Delta_y$ correspond to a larger error range. FIG. 8B depicts that when $S_y\neq0$ and $\Delta_y=0$, the depth calibration curves have different slopes but the same x-intercept for different values of the edge angle $\gamma$ [see also Equation (8), where the slope of d versus $1/z_d$ is given by $S_x+S_y\tan(\gamma)$]. FIG. 8C depicts that when $S_y=0$ and $\Delta_y\neq0$, the depth calibration curves have the same slope but different x-intercepts for different values of the edge angle $\gamma$. FIG. 8D depicts that when $S_y\neq0$ and $\Delta_y\neq0$, the depth calibration curves have both different slopes and different x-intercepts for different values of the edge angle $\gamma$.

Figure 13:
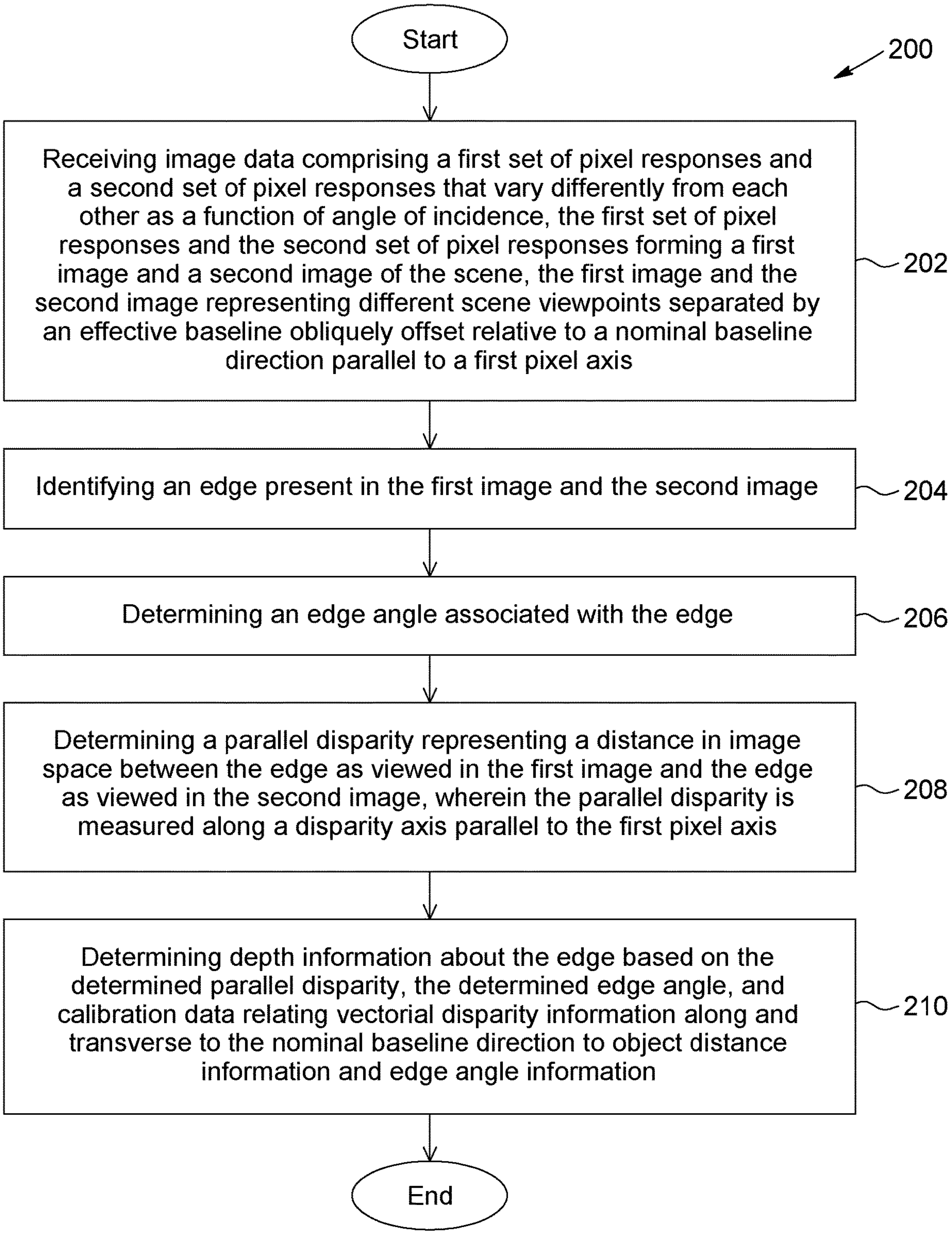
FIG. 13 is a flow diagram of a depth imaging method, in accordance with an embodiment.

Referring to FIG. 13, there is depicted a flow diagram of a depth imaging method 200. The method 200 can be embodied using a depth imaging system, such as the ones described and illustrated herein, or another suitable depth imaging system. Referring also to FIG. 5, the method 200 of FIG. 13 includes a step 202 of receiving image data from a scene 104 captured with a depth imaging system 100. The depth imaging system 100 includes an image sensor 112 configured to detect light 102 incident from the scene 104, and an angle-sensitive optical encoder, such as a TDM 108, interposed between the image sensor 112 and the scene 104. The image sensor 112 includes a pixel array having a first pixel axis 132 and a second pixel axis 134 orthogonal to each other. The TDM 108 has a grating axis 118 parallel to the first pixel axis 132. The TDM 108 is configured to modulate the incident light 102 prior to detection by the pixel array in accordance with an angle of incidence of the incident light 102. The received image data includes a first set of pixel responses $I_+$ and a second set of pixel responses $I_-$ corresponding to a first set of pixels $\mathbf{130}_O$ and a second set of pixels $\mathbf{130}_E$ of the pixel array, respectively. The first set of pixel responses $I_+$ and the second set of pixel responses $I_-$ vary differently from each other as a function of angle of incidence, where the angle of incidence lies in an incidence plane that contains the grating axis 118 and the first pixel axis 132. The first set of pixel responses $I_+$ and the second set of pixel responses $I_-$ form a first image 146 and a second image 148 of the scene 104. The first image 146 and the second image 148 represent two different viewpoints of the scene 104 separated from each other by an effective baseline 150 (see, e.g., FIGS. 7A to 7C), where the effective baseline 150 is defined by the TDM 108 and is oriented at a baseline angle $\sigma$ that is obliquely offset with respect to a nominal baseline direction parallel to the first pixel axis 132. In the present description, the term "oblique" refers to an angle or relationship between two quantities that is neither parallel (0°) nor perpendicular (90°).

The method 200 of FIG. 13 also includes a step 204 of identifying an edge 144 present in both the first image 146 and the second image 148. The edge 144 may be obliquely oriented relative to both the first pixel axis 132 (and thus the second pixel axis 134) and the effective baseline 150. The method 200 further includes a step 206 of determining an edge angle $\gamma$ associated with the edge 144, for example, with respect to one of the pixel axes 132, 134.

The method 200 also includes a step 208 of determining a parallel disparity $d_{\|}$ representing a distance in image space between the edge 144 as viewed in the first image 146 and the edge 144 as viewed in the second image 144, where the parallel disparity $d_{\|}$ is measured along a disparity axis parallel to the first pixel axis 132. The method 200 further includes a step 210 of determining depth information about the edge 144 based on the determined parallel disparity $d_{\|}$, the determined edge angle $\gamma$, and calibration data. The calibration relates (i) vectorial disparity information along both the first pixel axis 132 and the second pixel axis 134 (i.e., along and transverse to the nominal baseline direction) to (ii) object distance information and edge angle information. The calibration data can include a set of depth calibration curves, where each depth calibration curve corresponds to a different edge angle value and relates parallel disparity values to corresponding object distance values over an object distance range.

These and other possible steps of the method 200 are described in greater detail below.

In some embodiments, the step 204 of identifying an edge 144 associated with an object 142 in the scene 104 from image data captured by the imaging system 100, and the step 206 of determining the angle $\gamma$ of the identified edge 144 can be performed using various edge detection techniques. Non-limiting examples include gradient-based methods and Canny edge detection. It is appreciated that such techniques are generally known in the art and need not be described in detail herein. In some embodiments, the edge angle $\gamma$ can be determined by performing an edge angle determination operation on image data captured by the imaging system 100, for example, from $I_{sum}$. Once the edge angle $\gamma$ has been determined, the edge angle $\gamma$ can be used in Equation (8) to obtain the depth $z_d$ of the object 142 by performing steps 208 and 210.

In some embodiments, the determination of $z_a$ can include a step of determining $I_{sum}$ and $I_{diff}$ from the odd and even pixel responses ($I_+$, $I_-$) captured by the imaging system 100 [e.g., using Equations (2) and (3)]; a step of determining $d_{\|}$ from $I_{sum}$ and $I_{diff}$; and step of computing $z_d$ from Equation (8) using the determined values of $d_{\|}$ and $\gamma$ and the calibrated values of $S_x$, $S_y$, $z_f$, and $\Delta_y$ (i.e., step 210).

In other embodiments, the depth $z_d$ of the object 142 can be determined in a two-stage operation. The first stage can include a step of using the determined edge angle $\gamma$ to transform the parallel disparity di (e.g., obtained from $I_{sum}$ and $I_{diff}$) into a disparity that is independent of the edge angle $\gamma$, for example, the x-component, $d_x$, of the vectorial disparity $d_{TDM}$, which can be expressed as follows:

$$d_x = \frac{d_{\|} - \Delta_y \tan(\gamma)}{1 + \frac{S_y}{S_x}\tan(\gamma)}. \tag{10}$$

It is appreciated that the edge-angle-independent disparity $d_x$ is computed as a projection along the first pixel axis 132 of the distance in image space between corresponding points of the edge 144 as viewed in the first image 146 and the second image 148.

In the second stage, the depth $z_d$ of the object 142 can be obtained from edge-angle-independent calibration data, for example, a depth calibration curve relating $d_x$ to $z_d$ over a certain range of object distances. In some embodiments, the depth calibration curve can be expressed as follows:

$$d_x = S_x\left(\frac{1}{z_d} - \frac{1}{z_f}\right). \tag{11}$$

This two-stage operation can allow for the edge-angle parameters ($S_x/S_y$, $\Delta_y$) to be calibrated independently from the depth parameters ($S_x$, $z_f$) thus allowing for disparity variations due to edge-angle variations to be decoupled from disparity variations due to object-distance variations. Using such a two-stage operation for determining $z_d$ from $d_{\|}$ can be advantageous in embodiments where the focus distance $z_f$ needs to be adjusted during operation of the imaging system 100.

Figure 14:
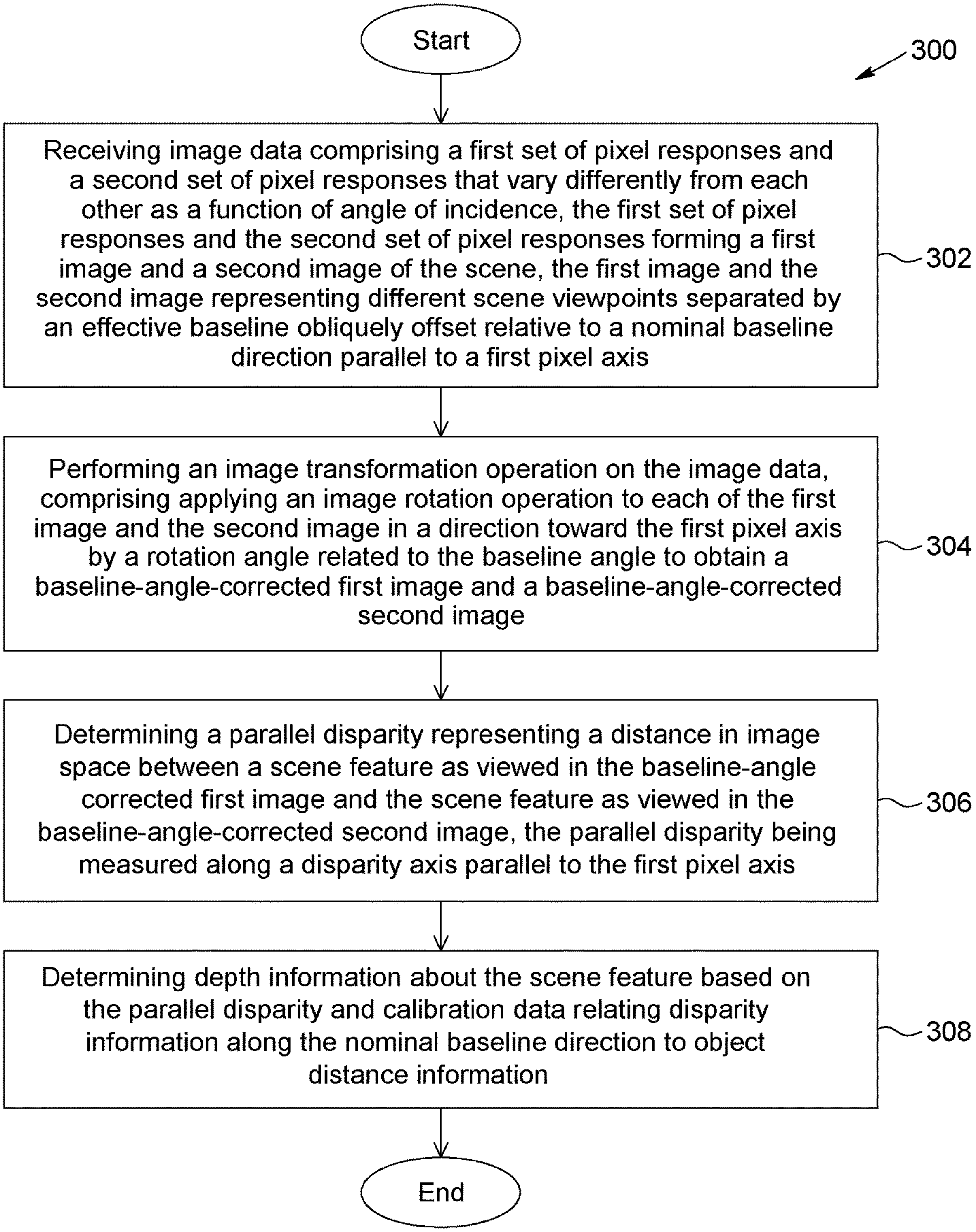
FIG. 14 is a flow diagram of a depth imaging method, in accordance with another embodiment.

Referring to FIG. 14, there is depicted a flow diagram of another depth imaging method 300. In this method 300, the effect of baseline angle on the disparity is accounted for by performing an image transformation operation on the image pair obtained from the set of odd pixel responses $I_+$ and the set of even pixel responses $I_-$. The image transformation operation need not involve extracting the angle $\gamma$ of an edge in the image pair. It has been found that, in some implementations, such an image transformation operation may be more robust and computationally efficient than an edge angle determination operation such as described above with respect to FIG. 13.

The method 300 can be embodied using a depth imaging system, such as the ones described and illustrated herein, or another suitable depth imaging system. Referring also to FIG. 5, the method 300 of FIG. 14 includes a step 302 of receiving image data from a scene 104 captured with a depth imaging system 100. The image data includes a first image 146 and the second image 148 representing two different viewpoints of the scene 104 separated from each other by an effective baseline oriented at a baseline angle $\sigma$ that is oblique with respect to the first pixel axis 132. This step 302 can be similar to the above-described receiving step 202 of the method 200 of FIG. 13, and thus need not be described in detail again.

The method 300 can further include a step 304 of performing an image transformation operation on the received image data. The image transformation operation includes applying an image rotation operation to each of the first image 146 and the second image 148 in a direction toward the first pixel axis 132 by a rotation angle related to the baseline angle $\sigma$, thereby obtaining a baseline-angle-corrected first image and a baseline-angle-corrected second image. The method 300 can also include a step 306 of determining a baseline-angle-corrected disparity representing a distance in image space between a scene feature as viewed in the baseline-angle-corrected first image and the same scene feature as viewed in the baseline-angle-corrected second image. The baseline-angle-corrected disparity is measured along a disparity axis parallel to the first pixel axis, and can therefore be referred to herein as a parallel disparity. The method 300 can further include a step 308 of determining depth information about the scene feature based on the determined baseline-angle-corrected disparity and calibration data relating disparity information along the first pixel axis (i.e., along the nominal baseline direction) to object distance information. In some embodiments, the calibration data a depth calibration curve relating parallel disparity values to corresponding object distance values over a range of object distances. In some embodiments, the object distance values are expressed with respect to a focus distance of the depth imaging system.

These and other possible steps of the method 300 are described in greater detail below.

Referring to Equation (6), the parameter $\Delta_y$ represents a constant, depth-independent disparity offset (e.g., in pixels), measured along the pixel axis 134 perpendicular to the grating axis 118 (i.e., transverse to the nominal baseline direction). The parameter $\Delta_y$ is measured between the odd image (i.e., the image formed by the set of odd pixel responses $I_+$) and the even image (i.e., the image formed by the set of even pixel responses $I_-$).

In some embodiments, the step 304 of performing the image transformation operation can include a step of applying a translation operation to the odd image and/or the even image (including to a portion thereof encompassing the scene feature under consideration) along the y direction (i.e., along a direction transverse to the nominal baseline direction) to compensate for the effect of $\Delta_y$ on the parallel disparity $d_{\|}$. Depending on the application, the translation operation can be applied to the odd image only (e.g., via a translation of $\Delta_y$ pixels in one direction along the pixel axis 134), to the even image only (e.g., via a translation of $\Delta_y$ pixels in the opposite direction along the pixel axis 134), or to both the odd image and the even image (e.g., via a translation of $\Delta_{y,1}$ pixels in one direction along the pixel axis 134 for the odd image and a translation of $\Delta_{y,2}$ in the opposite direction along the pixel axis 134 for the even image, where $\Delta_{y,1}+\Delta_{y,2}=\Delta_y$). In some embodiments, the constant offset $\Delta_y$ may correspond to an integer number of pixels, while in other embodiments, the constant offset $\Delta_y$ may correspond to a non-integer number of pixels. In some embodiments, the constant offset $\Delta_y$ may be less than one pixel, in which case the translation applied to the odd image may include an interpolation operation. Various image interpolation techniques can be used for this purpose, such as nearest-neighbor interpolation, bilinear interpolation or B-spline interpolation. Bilinear interpolation can be advantageous because it can be processed efficiently on modern graphical processing units (GPUs).

The translation operation yields a corrected image pair for which the offset parameter $\Delta_y$ is approximately zero. The corrected image pair can include a corrected odd (or first) image and corrected even (or second) image, where the corrected odd image is formed by a set of corrected odd pixel responses $I_+'$ and the corrected even image formed by a set of corrected even pixel responses $I_-'$. Referring to Equation (9), the corrected baseline angle σ' obtained after the translation operation can be written as follows:

$$\tan(\sigma') = \frac{S_y}{S_x}, \tag{12}$$

where σ' is independent of the object distance $z_d$. It is noted that Equation (12) can be obtained from Equation (9) by setting $\Delta_y=0$.

In some embodiments, the image transformation operation can include an image processing operation on the corrected odd and even images to obtain a corrected summed image and a corrected differential image. The corrected summed image is formed by a set of corrected summed pixel responses $I_{sum}'$, and the corrected differential image is formed by a set of corrected differential pixel responses $I_{diff}'$. The corrected summed image can be obtained by a step of applying an image rotation operation to the corrected odd and even images (including to a portion thereof encompassing the scene feature under consideration) by an angle σ', followed by a step of performing a summation operation on the rotated corrected odd and even images. The corrected differential image can be obtained by a step of applying an image rotation operation to the corrected odd and even images by an angle σ', followed by a step of performing a differential operation on the rotated corrected odd and even images.

The summation operation and the differential operation can each be performed in various manners. In some embodiments, the summation operation and the differential operation can each be performed in a binning mode (e.g., a 2×1 or 2×2 binning mode) or a convolution mode. For example, the convolution mode can involve using a kernel such the corrected summed and differential images have the same pixel resolution as the corrected odd and even images, where the kernel may be rotated by an angle σ' prior to being applied to the corrected odd and even images. In either mode, the rotation operation can include a step of interpolating the corrected odd and even images between pixel positions. It is appreciated that techniques for translating, rotating, and interpolating images are generally known in the art, and need not be described in detail herein other than to facilitate an understanding of the present techniques.

Once the corrected summed and differential images have been obtained, the set of corrected summed pixel responses $I_{sum}'$ and the set of corrected differential pixel responses $I_{diff}'$ can be used to compute a set of baseline-angle-corrected TDM disparities $d_{TDM}'$. The set of corrected TDM disparities $d_{TDM}'$ can in turn be used to obtain a baseline-angle-corrected TDM disparity map that is compensated for the offset baseline orientation. Depth information about the scene feature can be obtained from the baseline-angle-corrected TDM disparity map and calibration data (e.g., a depth calibration curve) relating disparity information to object distance information over a range of object distances [e.g., using Equation (4), the object distance values are expressed with respect to a focus distance of the depth imaging system].

Figure 9A:
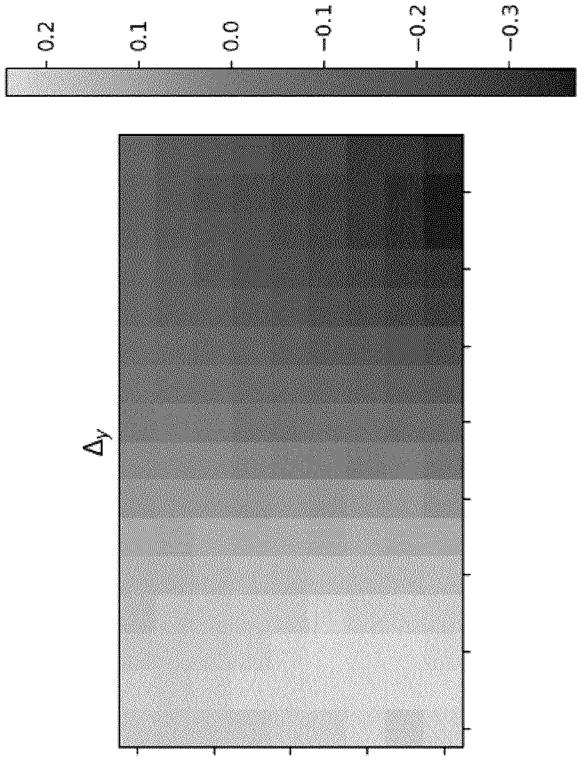
FIGS. 9A and 9B are contour plots depicting examples of how the values of $\Delta_y$ (FIG. 9A) and $S_y/S_x$ (FIG. 9B) can change as a function of position across the pixel array.
Figure 9B:
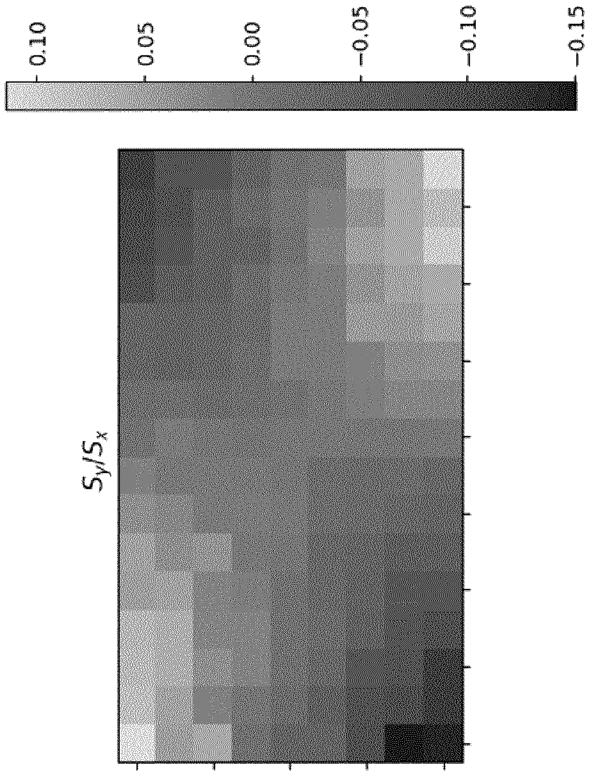

It is appreciated that the values of $S_x$, $S_y$, $z_f$, and $\Delta_y$ can vary across the pixel array, in which case the edge position within the image may need to be considered when computing edge-angle-corrected TDM disparity maps. FIGS. 9A and 9B are contour plots depicting examples of how the values of $\Delta_y$ (FIG. 9A) and $S_y/S_x$ (FIG. 9B) can change as a function of position across the pixel array. As noted above, the parameters $\Delta_y$ and $S_y/S_x$ are relevant parameters for edge angle correction. The spatial distributions of the values of $S_x$, $S_y$, $z_f$, and $\Delta_y$ across the pixel array can be modeled or determined by calibration, which may include calibration curves and lookup tables.

Figure 10:
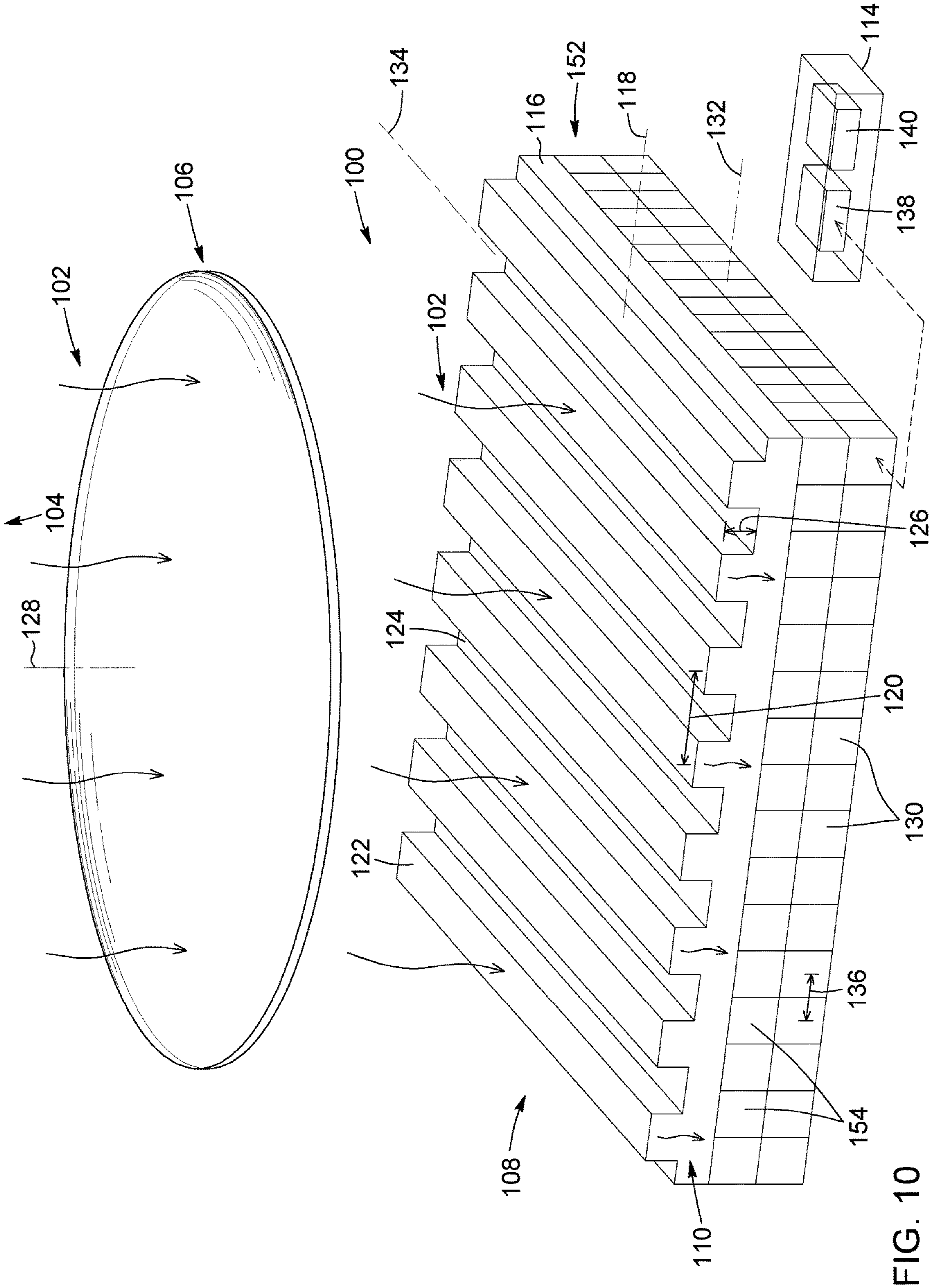
FIG. 10 is a schematic perspective view of a depth imaging system, in accordance with another embodiment.

Referring to FIG. 10, there is illustrated another embodiment of a depth imaging system 100 in which the present techniques for edge angle correction may be used. The embodiment of FIG. 10 shares several features with the embodiment of FIGS. 1 and 2, which will not be described again other than to highlight differences between them. In contrast to the embodiment of FIGS. 1 and 2, which is intended for monochrome applications, the embodiment of FIG. 10 is intended for color applications. In FIG. 10, the image sensor 112 includes a color filter array 152 interposed between the TDM 108 and the array of pixels 130. The color filter array 152 includes a plurality of color filters 154 arranged in a mosaic color pattern. The color filter array 152 is configured to filter the diffracted light 110 produced by the TDM 108 spatially and spectrally according to the mosaic color pattern prior to detection of the diffracted light 110 by the array of pixels 130. In some embodiments, the color filters 154 may include red, green, and blue filters, although other filters may alternatively or additionally be used in other embodiments, such as yellow filters, cyan filters, magenta filters, clear or white filters, and infrared filters. In some embodiments, the mosaic color pattern of the color filter array 152 may be an RGGB Bayer pattern, although other mosaic color patterns may be used in other embodiments, including both Bayer-type and non-Bayer-type patterns. Non-limiting examples include, to name a few, RGB-IR, RGB-W, CYGM, and CYYM patterns. In color implementations, the determination of image data and disparity maps from the pixel responses measured by the pixels 130 can be performed on a per-color basis by parsing the pixel data according to color components, for example, based on techniques such as or similar to those described in co-assigned international patent applications PCT/CA2017/050686 (published as WO 2017/210781), PCT/CA2018/051554 (published as WO 2019/109182), and PCT/CA2020/050760 (published as WO 2020/243828).

For simplicity, several embodiments described above include TDMs provided with a single diffraction grating and, thus, a single grating orientation. However, it is appreciated that, in practice, TDMs may include a large number of diffraction gratings and may include multiple grating orientations. In some embodiments, the TDM may include a first set of diffraction gratings and a second set of diffraction grating, where the grating axes of the diffraction gratings of the first set are orthogonal to the grating axes of the diffraction gratings of the second set. Reference is made to co-assigned international patent applications PCT/CA2021/051635 (published as WO 2022/104467) and PCT/CA2022/050018 (published as WO 2022/150903). In some embodiments, the first set of diffraction gratings and the second set of diffraction gratings may be interleaved in rows and columns to define a checkerboard pattern. It is appreciated, however, that any other suitable regular or irregular arrangements of orthogonally or non-orthogonally oriented sets of diffraction gratings may be used in other embodiments. For example, in some variants, the orthogonally oriented sets of diffraction gratings may be arranged to alternate only in rows or only in columns, or be arranged randomly. Other variants may include more than two sets of diffraction gratings.

In addition, although several embodiments described above include TDMs provided with one-dimensional, binary phase gratings formed of alternating sets of parallel ridges and grooves defining a square-wave grating profile, other embodiments may use TDMs with other types of diffraction gratings. For example, other embodiments may use diffraction gratings where any, some, or all of the grating period, the duty cycle, and the step height are variable; diffraction gratings with non-straight features perpendicular to the grating axis; diffraction gratings having more elaborate grating profiles; 2D diffraction gratings; photonic crystal diffraction gratings; and the like. The properties of the diffracted light may be tailored by proper selection of the grating parameters. Furthermore, in embodiments where TDMs include multiple sets of diffraction gratings, the diffraction gratings in different sets need not be identical. In general, a TDM may be provided as a grating tile made up of many grating types, each grating type being characterized by a particular set of grating parameters. Non-limiting examples of such grating parameters include the grating orientation, the grating period, the duty cycle, the step height, the number of grating periods, the lateral offset with respect to the underlying pixels and/or color filters, the grating-to-sensor distance, and the like.

Figure 11:
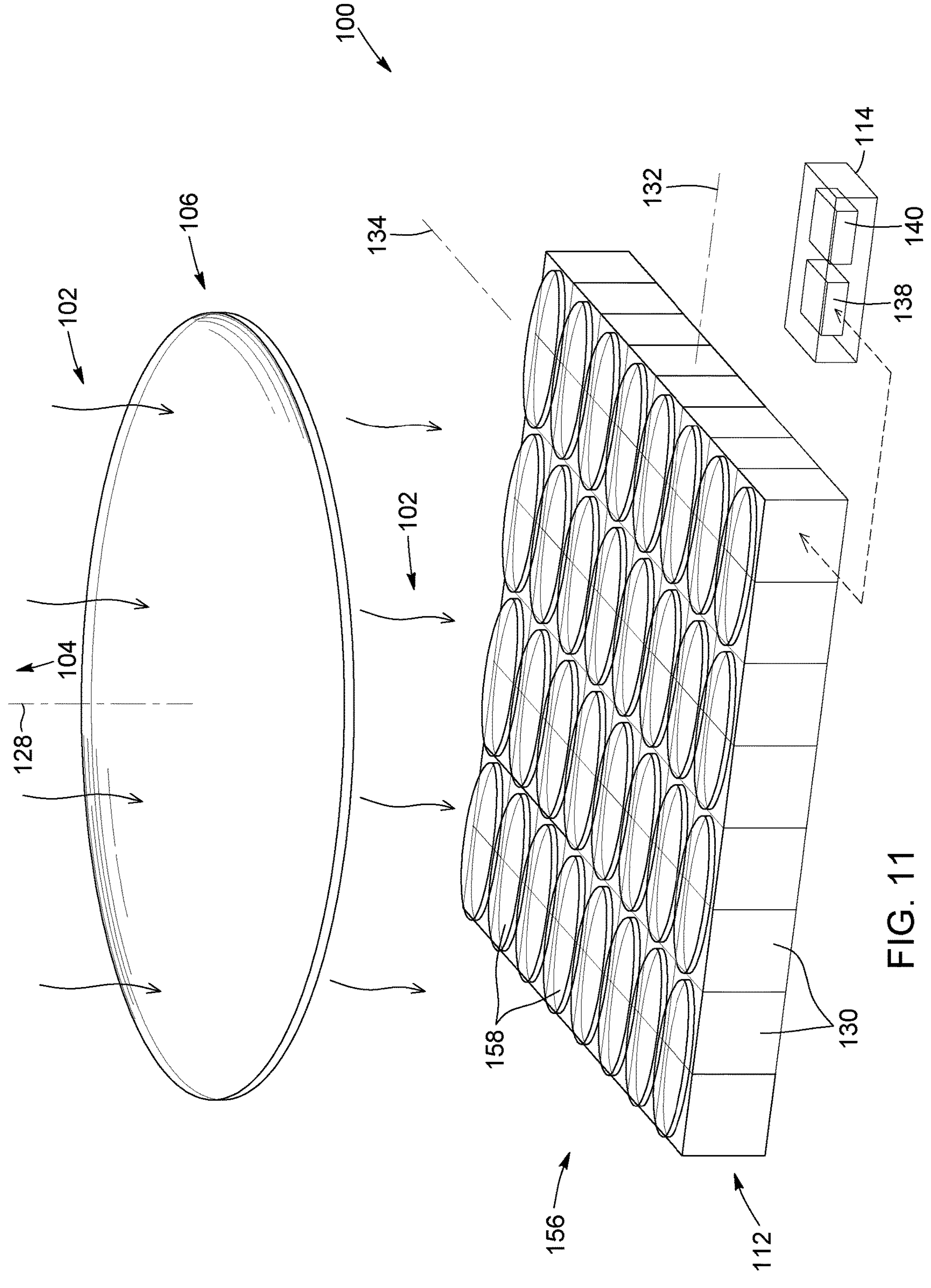
FIG. 11 is a schematic perspective view of a depth imaging system, in accordance with another embodiment.

Furthermore, although several embodiments described above use TDMs as angle-sensitive optical encoders, other embodiments may use other types of optical encoders with angle encoding capabilities. Referring to FIG. 11, there is illustrated another embodiment of a monocular depth imaging system 100 that can be used to implement the techniques for edge angle and baseline angle correction disclosed herein. The imaging system 100 of FIG. 11 is configured for capturing image data representative of light 102 received from a scene 104. The imaging system 100 generally includes an imaging lens 106, an angle-sensitive optical encoder embodied by a microlens array 156 having a plurality of microlenses 158, an image sensor 112 having a plurality of pixels 130, and a computer device 114 including a processor 138 and a memory 140. In the illustrated embodiment, the microlens array 156 acts as an optical encoder of angle-of-incidence information. Each microlens 158 of the microlens array 156 covers two pixels 130 of the image sensor 112. The microlens array 156 is configured to direct the light 102 received from the scene 104 onto the image sensor 112 for detection by the pixels 130. The computer device 114 is configured to process the image data generated by the image sensor 112 to determine angle-of-incidence information about the received light 102, from which depth information about the scene 104 may be determined. It is appreciated that FIG. 11 is a simplified schematic representation that illustrates a number of components of the imaging system 100, such that additional features and components that may be useful or necessary for the practical operation of the imaging system 100 may not be specifically depicted.

The provision of the microlens array 156 interposed between the image sensor 112 and the scene 104, where each microlens 158 covers two or more pixels 130 of the image sensor 112, can impart the imaging system 100 with 3D imaging capabilities, including depth sensing capabilities. This is because the different pixels 130 in each pixel pair or group under a given microlens 158 have different angular responses, that is, they produce different sets of pixel responses ($I_+$, $I_-$) in response to varying the angle of incidence of the received light 102. These responses are similar to the odd and even pixel responses introduced above with respect to TDM-based implementations. In microlens-based implementations, the pixels 130 of the image sensor 112 may be referred to as phase detection pixels. Furthermore, similar TDM-based implementations, the pair of images formed by the sets of pixel responses ($I_+$, $I_-$) can provide two slightly different views of the scene 104, separated by an effective baseline distance which may not be parallel to one of the pixel axes. In such a case, the disparity map obtained from the image pair may be baseline- or edge-angle-dependent, and thus may be corrected using the techniques disclosed herein.

Figure 12:
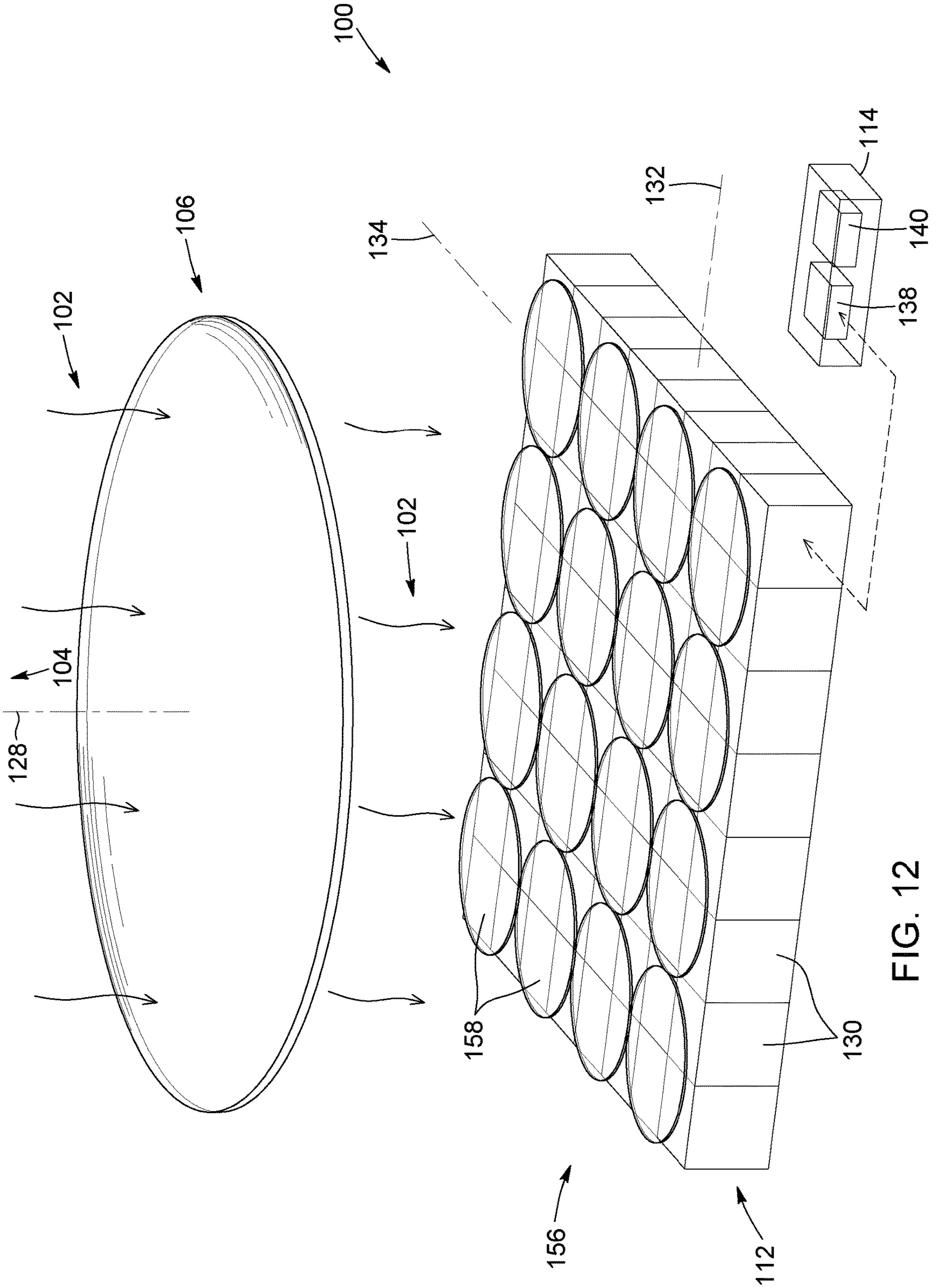
FIG. 12 is a schematic perspective view of a depth imaging system, in accordance with another embodiment.

It is appreciated that although the embodiment of FIG. 11 depicts a configuration where each microlens 158 covers a group of 2×1 pixels 130, other configurations are possible in other embodiments. For example, in some embodiments, each microlens 158 may cover a group of 2×2 pixels 130, as depicted in FIG. 12. Such arrangements can be referred to as quad-pixel arrangements. In other embodiments, each microlens may cover one pixel, but the pixel under the microlens may be split in two subpixels, thus providing a configuration similar to the one shown in FIG. 11. Such arrangements can be referred to as dual-pixel arrangements. In yet other embodiments, each microlens may cover one pixel, but the pixel under the microlens may be half-masked to provide angle-sensitivity capabilities.

It is appreciated that the structure, configuration, and operation of imaging devices using phase detection pixels, quad-pixel technology, dual-pixel technology, half-masked pixel technologies, and other approaches using microlens arrays over pixel arrays to provide 3D imaging capabilities are generally known in the art, and need not be described in detail herein other than to facilitate an understanding of the present techniques.

In accordance with another aspect of the present description, there is provided a non-transitory computer readable storage medium having stored thereon computer readable instructions that, when executed by a processor, cause the processor to perform a depth imaging method as disclosed herein.

In accordance with another aspect of the present description, there is provided a computer device including a processor and a non-transitory computer readable storage medium such as described herein and being operatively coupled to the processor. FIGS. 1, 2, 5, and 10 to 12 each depict an example of a computer device 114 that includes a processor 138 and a non-transitory computer readable storage medium 140 (also referred to above as a memory) operably connected to the processor 138.

Numerous modifications could be made to the embodiments described above without departing from the scope of the appended claims.

The invention claimed is:

1. A depth imaging method, comprising:

receiving image data from a scene captured with a depth imaging system comprising (i) an image sensor configured to detect light incident from the scene and (ii) an angle-sensitive optical encoder interposed between the image sensor and the scene, the image sensor comprising a pixel array having a first pixel axis and a second pixel axis orthogonal to each other, and the angle-sensitive optical encoder being configured to modulate the incident light prior to detection by the pixel array in accordance with an angle of incidence of the incident light, wherein the image data comprises a first set of pixel responses and a second set of pixel responses corresponding to a first set of pixels and a second set of pixels of the pixel array, respectively, wherein the first set of pixel responses and the second set of pixel responses vary differently from each other as a function of angle of incidence, wherein the first set of pixel responses and the second set of pixel responses form a first image and a second image of the scene, respectively, and wherein the first image and the second image represent two different viewpoints of the scene separated from each other by an effective baseline defined by the angle-sensitive optical encoder and oriented at a baseline angle that is obliquely offset with respect to a nominal baseline direction parallel to the first pixel axis;

identifying an edge present in the first image and the second image;

determining an edge angle associated with the edge;

determining a parallel disparity representing a distance in image space between the edge as viewed in the first image and the edge as viewed in the second image, wherein the parallel disparity is measured along a disparity axis parallel to the first pixel axis; and determining depth information about the edge based on the determined parallel disparity, the determined edge angle, and calibration data relating vectorial disparity information along and transverse to the nominal baseline direction to object distance information and edge angle information.

2. The method of claim 1, wherein determining the parallel disparity comprises:

computing a plurality of summed pixel responses based on a sum operation between the first set of pixel responses and the second set of pixel responses;

computing a plurality of differential pixel responses based on a difference operation between the first set of pixel responses and the second set of pixel responses; and computing the parallel disparity based on the plurality of summed pixel responses and the plurality of differential pixel responses.

3. The method of claim 1, wherein the calibration data comprises a set of depth calibration curves, each depth calibration curve corresponding to a different edge angle value and relating parallel disparity values to corresponding object distance values over a range of object distances.

4. The method of claim 3, wherein each depth calibration curve is expressed mathematically as follows:

$$d_{\parallel} = (S_x + S_y\tan(\gamma))\left(\frac{1}{z_d} - \frac{1}{z_f}\right) + \Delta_y\tan(\gamma),$$

wherein $d_{\parallel}$ is the parallel disparity, $S_x$ is a depth sensitivity parameter of the angle-sensitive optical encoder along the nominal baseline direction, $S_y$ is a depth sensitivity parameter of the angle-sensitive optical encoder transverse to the nominal baseline direction, $\gamma$ is the edge angle value associated with the depth calibration curve, $z_d$ is the object distance, $z_f$ is a focus distance of the depth imaging system, and $\Delta_y$ is depth-independent disparity offset measured transverse to the nominal baseline direction.

5. The method of claim 1, wherein determining the depth information about the edge comprises:

computing an edge-angle-independent disparity from the determined edge angle and the determined parallel disparity; and computing the depth information from the computed edge-angle-independent disparity.

6. The method of claim 1, wherein the angle-sensitive optical encoder comprises a transmissive diffraction mask (TDM) having a grating axis parallel to the first pixel axis, the TDM being configured to diffract the light incident from the scene to generate diffracted light, the diffracted light having angle-dependent information encoded therein for detection by the image sensor as the captured image data.

7. A non-transitory computer readable storage medium having stored thereon computer readable instructions that, when executed by a processor, cause the processor to perform the method of claim 1.

8. A depth imaging system, comprising:

an image sensor comprising a pixel array having a first pixel axis and a second pixel axis orthogonal to each other;

an angle-sensitive optical encoder disposed over the image sensor; and a computer device operatively coupled to the image sensor and comprising a processor and a non-transitory computer readable storage medium having stored thereon computer readable instructions that, when executed by the processor, cause the processor to perform operations, wherein the image sensor is configured to capture image data from a scene by detecting, with the pixel array, light incident from the scene having passed through the angle-sensitive optical encoder, wherein the image data comprises a first set of pixel responses corresponding to a first set of pixels of the pixel array and a second set of pixel responses corresponding to a second set of pixels of the pixel array, wherein the first set of pixel responses form a first image of the scene and the second set of pixel responses form a second image of the scene, and wherein the first image and the second image represent two different viewpoints of the scene separated from each other by an effective baseline defined by the angle-sensitive optical encoder and oriented at a baseline angle that is obliquely offset with respect to a nominal baseline direction parallel to the first pixel axis, wherein the angle-sensitive optical encoder is configured to modulate the incident light prior to detection by the pixel array in accordance with an angle of incidence of the incident light such that the first set of pixel responses and the second set of pixel responses vary differently from each other as a function of angle of incidence, and wherein the operations performed by the processor comprise:

receiving the image data from the scene captured by the image sensor;

identifying an edge present in the first image and the second image;

determining an edge angle associated with the edge;

determining a parallel disparity representing a distance in image space between the edge as viewed in the first image and the edge as viewed in the second image, wherein the parallel disparity is measured along a disparity axis parallel to the first pixel axis; and determining depth information about the edge based on the determined parallel disparity, the determined edge angle, and calibration data relating vectorial disparity information along and transverse to the nominal baseline direction to object distance information and edge angle information.

9. The depth imaging system of claim 8, wherein the angle-sensitive optical encoder comprises a transmissive diffraction mask (TDM), the TDM having a grating axis parallel to the first pixel axis and being configured to diffract the light incident from the scene to generate diffracted light, the diffracted light having angle-dependent information encoded therein for detection by the image sensor as the captured image data.

10. The depth imaging system of claim 8, wherein the angle-sensitive optical encoder comprises an array of microlenses, each microlens covering at least two pixels of the image sensor.

11. The depth imaging system of claim 8, wherein determining the parallel disparity comprises:

computing a plurality of summed pixel responses based on a sum operation between the first set of pixel responses and the second set of pixel responses;

computing a plurality of differential pixel responses based on a difference operation between the first set of pixel responses and the second set of pixel responses; and computing the parallel disparity based on the plurality of summed pixel responses and the plurality of differential pixel responses.

12. The depth imaging system of claim 8, wherein the calibration data comprises a set of depth calibration curves, each depth calibration curve corresponding to a different edge angle value and relating parallel disparity values to corresponding object distance values over a range of object distances.

13. A depth imaging method, comprising:

receiving image data from a scene captured with a depth imaging system comprising (i) an image sensor configured to detect light incident from the scene and (ii) an angle-sensitive optical encoder interposed between the image sensor and the scene, the image sensor comprising a pixel array having a first pixel axis and a second pixel axis orthogonal to each other, and the angle-sensitive optical encoder being configured to modulate the incident light prior to detection by the pixel array in accordance with an angle of incidence of the incident light, wherein the image data comprises a first set of pixel responses and a second set of pixel responses corresponding to a first set of pixels and a second set of pixels of the pixel array, respectively, wherein the first set of pixel responses and the second set of pixel responses vary differently from each other as a function of angle of incidence, wherein the first set of pixel responses and the second set of pixel responses form a first image and a second image of the scene, respectively, and wherein the first image and the second image represent two different viewpoints of the scene separated from each other by an effective baseline defined by the angle-sensitive optical encoder and oriented at a baseline angle that is obliquely offset with respect to a nominal baseline direction parallel to the first pixel axis;

performing an image transformation operation on the image data, wherein the image transformation operation comprises applying an image rotation operation to each of the first image and the second image in a direction toward the first pixel axis by a rotation angle related to the baseline angle, thereby obtaining a baseline-angle-corrected first image and a baseline-angle-corrected second image;

determining a parallel disparity representing a distance in image space between a scene feature as viewed in the baseline-angle-corrected first image and the scene feature as viewed in the baseline-angle-corrected second image, wherein the parallel disparity is measured along a disparity axis parallel to the first pixel axis; and determining depth information about the edge based on the parallel disparity and calibration data relating disparity information along the nominal baseline direction to object distance information.

14. The method of claim 13, wherein the baseline-angle-corrected first image is composed of a first set of corrected pixel responses related to the first set of pixel responses by the image rotation operation, the baseline-angle-corrected second image is composed of a second set of corrected pixel responses related to the second set of pixel responses by the image rotation operation, and wherein determining the parallel disparity comprises:

computing a corrected summed image based on a sum operation between the first set of corrected pixel responses and the second set of corrected pixel responses;

computing a corrected differential image based on a difference operation between the first set of corrected pixel responses and the second set of corrected pixel responses; and computing the parallel disparity based on the corrected summed image and the corrected differential image.

15. The method of claim 13, wherein the image transformation operation further comprises, prior to applying the image rotation operation to the first image and the second image:

applying an image translation operation to the first image and/or the second image along a translation direction transverse to the nominal baseline direction to correct for a depth-independent disparity offset in the response of the depth imaging system.

16. The method of claim 15, wherein the depth-independent disparity offset is less than one pixel, and the image translation operation comprises an interpolation operation.

17. The method of claim 13, wherein the angle-sensitive optical encoder comprises a transmissive diffraction mask (TDM) having a grating axis parallel to the first pixel axis, the TDM being configured to diffract the light incident from the scene to generate diffracted light, the diffracted light having angle-dependent information encoded therein for detection by the image sensor as the captured image data.

18. A non-transitory computer readable storage medium having stored thereon computer readable instructions that, when executed by a processor, cause the processor to perform the method of claim 13.

19. A depth imaging system, comprising:

an image sensor comprising a pixel array having a first pixel axis and a second pixel axis orthogonal to each other;

an angle-sensitive optical encoder disposed over the image sensor; and a computer device operatively coupled to the image sensor and comprising a processor and a non-transitory computer readable storage medium having stored thereon computer readable instructions that, when executed by the processor, cause the processor to perform operations, wherein the image sensor is configured to capture image data from a scene by detecting, with the pixel array, light incident from the scene having passed through the angle-sensitive optical encoder, wherein the image data comprises a first set of pixel responses corresponding to a first set of pixels of the pixel array and a second set of pixel responses corresponding to a second set of pixels of the pixel array, wherein the first set of pixel responses form a first image of the scene and the second set of pixel responses form a second image of the scene, and wherein the first image and the second image represent two different viewpoints of the scene separated from each other by an effective baseline defined by the angle-sensitive optical encoder and oriented at a baseline angle that is obliquely offset with respect to a nominal baseline direction parallel to the first pixel axis, wherein the angle-sensitive optical encoder is configured to modulate the incident light prior to detection by the pixel array in accordance with an angle of incidence of the incident light such that the first set of pixel responses and the second set of pixel responses vary differently from each other as a function of angle of incidence, and wherein the operations performed by the processor comprise:

receiving the image data from the scene captured by the image sensor;

performing an image transformation operation on the image data, wherein the image transformation operation comprises applying an image rotation operation to each of the first image and the second image in a direction toward the first pixel axis by a rotation angle equal to the baseline angle, thereby obtaining a baseline-angle-corrected first image and a baseline-angle-corrected second image;

determining a parallel disparity representing a distance in image space between a scene feature as viewed in the baseline-angle-corrected first image and the scene feature as viewed in the baseline-angle-corrected second image, wherein the parallel disparity is measured along a disparity axis parallel to the first pixel axis; and determining depth information about the scene feature based on the parallel disparity and calibration data relating disparity information along the nominal baseline direction to object distance information.

20. The depth imaging system of claim 19, wherein the angle-sensitive optical encoder comprises a transmissive diffraction mask (TDM), the TDM having a grating axis parallel to the first pixel axis and being configured to diffract the light incident from the scene to generate diffracted light, the diffracted light having angle-dependent information encoded therein for detection by the image sensor as the captured image data.

21. The depth imaging system of claim 19, wherein the angle-sensitive optical encoder comprises an array of microlenses, each microlens covering at least two pixels of the image sensor.

* * * * *